US00RE47726E

(19) United States
(12) Reissued Patent
Aoki et al.

(10) Patent Number: US RE47,726 E
(45) Date of Reissued Patent: Nov. 12, 2019

(54) IMAGE FORMING APPARATUS

(71) Applicant: Ricoh Company, Ltd., Tokyo (JP)

(72) Inventors: Shinji Aoki, Kanagawa (JP); Haruo Iimura, Kanagawa (JP); Yasuhiko Ogino, Kanagawa (JP); Tadashi Kasai, Kanagawa (JP); Naomi Sugimoto, Kanagawa (JP); Shinya Tanaka, Kanagawa (JP); Keigo Nakamura, Kanagawa (JP)

(73) Assignee: RICOH COMPANY, LTD., Tokyo (JP)

(21) Appl. No.: 15/081,509

(22) Filed: Mar. 25, 2016

Related U.S. Patent Documents

Reissue of:
(64) Patent No.: 9,020,382
Issued: Apr. 28, 2015
Appl. No.: 13/690,408
Filed: Nov. 30, 2012

(30) Foreign Application Priority Data

Dec. 13, 2011 (JP) ..... 2011-272106

(51) Int. Cl.
*G03G 15/16* (2006.01)
*G03G 15/01* (2006.01)

(52) U.S. Cl.
CPC ..... *G03G 15/0131* (2013.01); *G03G 15/0189* (2013.01); *G03G 15/1675* (2013.01); *G03G 2215/0129* (2013.01)

(58) Field of Classification Search
CPC ..... G03G 15/0131; G03G 15/0189; G03G 15/1675; G03G 15/605; G03G 2215/0129
See application file for complete search history.

(56) References Cited

U.S. PATENT DOCUMENTS 6,097,919 A * 8/2000 Takeuchi et al. ..... 399/298
8,626,012 B2 * 1/2014 Yoshioka ..... 399/45
(Continued)

FOREIGN PATENT DOCUMENTS

JP 8-023455 1/1996
JP H8-166727 A 6/1996
(Continued)

OTHER PUBLICATIONS

U.S. Appl. No. 13/548,735, filed Jul. 13, 2012, Masakazu Terao, et al.

(Continued)

*Primary Examiner* — James A Menefee
(74) *Attorney, Agent, or Firm* — Xsensus LLP

(57) ABSTRACT

An image forming apparatus includes a nip forming member and a transfer bias output device that outputs a transfer bias to form a transfer electric field in a transfer nip between the nip forming member and an intermediate transfer member. Upon transfer of a composite toner image including a particular toner image onto a recording medium in the transfer nip, the transfer bias output device outputs the transfer bias including a first superimposed bias in which a direct current (DC) component is superimposed on an alternating current (AC) component. Upon transfer of the composite toner image without the particular toner image onto the recording medium in the transfer nip, the transfer bias output device outputs one of the transfer bias including a second superimposed bias having a peak-to-peak value of the AC component smaller than that of the first superim-
(Continued)

posed bias and the transfer bias including only the DC component.

31 Claims, 6 Drawing Sheets

(56) References Cited

U.S. PATENT DOCUMENTS

| | | | | |
|---|---|---|---|---|
| 8,699,903 | B2 * | 4/2014 | Harashima | 399/66 |
| 2005/0025535 | A1 | 2/2005 | Koichi et al. | |
| 2005/0030595 | A1 | 2/2005 | Koichi et al. | |
| 2008/0080885 | A1 * | 4/2008 | Kidaka | G03G 15/0131 399/66 |
| 2009/0123168 | A1 | 5/2009 | Aoki et al. | |
| 2009/0142087 | A1 | 6/2009 | Iimura | |
| 2009/0279109 | A1 | 11/2009 | Shiozawa | |
| 2010/0080631 | A1 * | 4/2010 | Ogiyama | G03G 15/0194 399/308 |
| 2010/0136476 | A1 * | 6/2010 | Fujisaki | G03G 9/0821 430/124.1 |
| 2010/0232820 | A1 | 9/2010 | Usami et al. | |
| 2010/0284705 | A1 | 11/2010 | Aoki et al. | |
| 2010/0310272 | A1 * | 12/2010 | Mashtare | G03G 21/1604 399/107 |
| 2011/0200348 | A1 | 8/2011 | Aoki | |
| 2011/0206429 | A1 | 8/2011 | Terao et al. | |
| 2011/0229168 | A1 | 9/2011 | Shiraishi et al. | |
| 2011/0255892 | A1 | 10/2011 | Aoki | |
| 2012/0027432 | A1 * | 2/2012 | Brown | G03G 15/0851 399/27 |
| 2012/0045231 | A1 | 2/2012 | Ogino et al. | |
| 2012/0045237 | A1 | 2/2012 | Aoki et al. | |
| 2012/0045259 | A1 | 2/2012 | Nakamura et al. | |
| 2012/0105915 | A1 | 5/2012 | Kobayashi et al. | |
| 2012/0107004 | A1 | 5/2012 | Sonohara et al. | |
| 2012/0224873 | A1 | 9/2012 | Aoki | |
| 2012/0230715 | A1 | 9/2012 | Ogino et al. | |
| 2012/0237234 | A1 | 9/2012 | Sugimoto et al. | |
| 2012/0243892 | A1 | 9/2012 | Nakamura et al. | |
| 2012/0308250 | A1 * | 12/2012 | Shimizu et al. | 399/66 |
| 2014/0079423 | A1 | 3/2014 | Shiraishi et al. | |

FOREIGN PATENT DOCUMENTS

| | | | |
|---|---|---|---|
| JP | 10-065918 | | 3/1998 |
| JP | 10-301408 | | 11/1998 |
| JP | 2007-057902 | A | 3/2007 |
| JP | 2008-058585 | | 3/2008 |
| JP | 2009-294634 | A | 12/2009 |
| JP | 2010-048921 | | 3/2010 |
| JP | 2010-139811 | A | 6/2010 |
| JP | 2011-013241 | | 1/2011 |
| JP | 2011-150207 | A | 8/2011 |
| JP | 2011-191579 | A | 9/2011 |
| JP | 2011-197319 | | 10/2011 |
| JP | 2012-027076 | A | 2/2012 |

OTHER PUBLICATIONS

U.S. Appl. No. 13/548,655, Jun. 13, 2012, Masakazu Terao, et al.
U.S. Appl. No. 13/526,894, filed Jun. 19, 2012, Tomokazu Takeuchi, et al.
U.S. Appl. No. 13/525,681, filed Jun. 18, 2012, Naomi Sugimoto, et al.
U.S. Appl. No. 13/680,629, filed Nov. 19, 2012, Hiromi Ogiyama, et al.
U.S. Appl. No. 13/603,746, filed Sep. 5, 2012, Tadashi Kasai, et al.
U.S. Appl. No. 13/666,474, filed Nov. 1, 2012, Yasunobu Shimizu, et al.
U.S. Appl. No. 13/602,840, filed Sep. 4, 2012, Keigo Nakamura, et al.
U.S. Appl. No. 13/646,898, filed Oct. 8, 2012, Ryuuichi Mimbu, et al.
U.S. Appl. No. 13/651,776, filed Oct. 15, 2012, Shinya Tanaka, et al.
U.S. Appl. No. 13/645,764, filed Oct. 5, 2012, Shinji Aoki.

* cited by examiner

Amended
FIG. 1 Prior Art
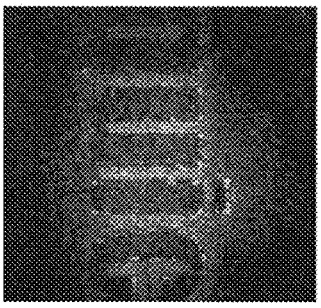
Amended
FIG. 2 Prior Art
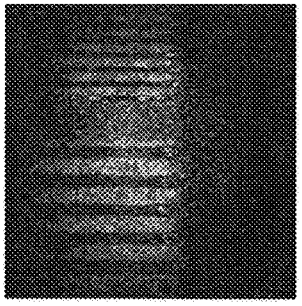
Amended
FIG. 3 Prior Art
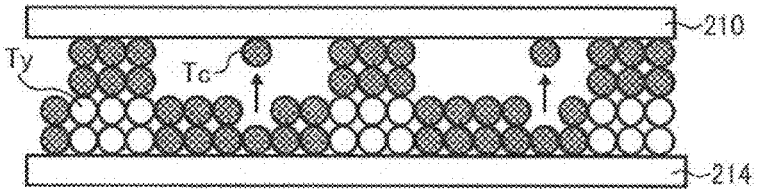
Amended
FIG. 4 Prior Art
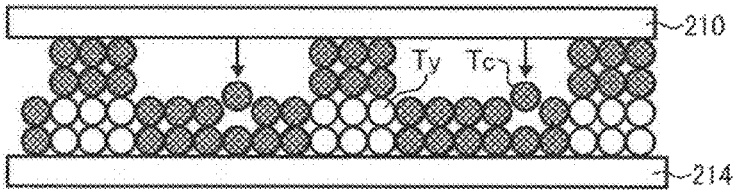
Amended
FIG. 5 Prior Art
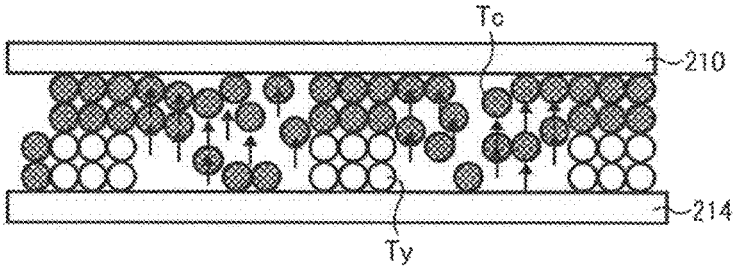

IMAGE FORMING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [patent] *is a reissue* application *of U.S. Pat. No. 9,020,382 issued Apr. 28, 2015, which* is based on and claims priority pursuant to 35 U.S.C. §119 to Japanese Patent Application No. 2011-272106, filed on Dec. 13, 2011, in the Japan Patent Office, the entire disclosure of which is hereby incorporated by reference herein.

BACKGROUND OF THE INVENTION

1. Field of the Invention

Exemplary aspects of the present disclosure generally relate to an image forming apparatus, such as a copier, a facsimile machine, a printer, or a multi-functional system including a combination thereof, and more particularly to, an image forming apparatus using an intermediate transfer method in which a plurality of toner images formed on a plurality of image bearing members are transferred onto an intermediate transfer member and then to a recording medium.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photosensitive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

In known electrophotographic image forming apparatuses, toner images of yellow (Y), magenta (M), cyan (C), and black (K) are formed on photosensitive drums of the respective colors and transferred onto an intermediate transfer member such as an intermediate transfer belt such that they are superimposed one atop the other, thereby forming a composite toner image on the intermediate transfer member in a process known as a primary transfer process. Subsequently, the composite toner image is transferred secondarily onto a recording medium in a secondary transfer nip at which the intermediate transfer member and a nip forming member contact. This process is known as a secondary transfer process.

This type of image forming apparatuses may be equipped with an additional photosensitive drum for forming a special color toner image such as a transparent toner image, in addition to the photosensitive drums for black and primary colors yellow, and magenta. The transparent toner image is formed on the photosensitive drum to add a glossy effect to a certain area of the composite toner image. Generally, the transparent toner image is transferred primarily onto the intermediate transfer member first. Subsequently, the toner images of yellow, magenta, cyan, and black are transferred one atop the other on the transparent toner image on the intermediate transfer member. In the secondary transfer process, the composite toner image on the transparent toner image is transferred onto a recording medium. Accordingly, the transparent toner image is on top of the composite toner image to provide the glossy effect on the color image.

With diversified color expression in recent years, a solid transparent toner image is formed to enhance the glossy effect on a solid image. In addition to the solid image, a fine line, an outline of an image, and a character image are expressed with the transparent toner. Present inventors performed experiments in which a fine-line image and a character image were formed with the transparent toner on top of a solid color background image formed with toner of a single color or a composite of at least two colors among yellow, magenta, cyan, and black.

As shown in FIGS. 1 and 2, an image density of the solid color background image around the fine-line image and the character image formed with the transparent toner dropped significantly. In other words, inadequate transfer of toner, also known as dropouts, occurred around the line image and the character image. The inadequate transfer of toner occurred because the recording medium did not contact tightly around the fine-line image and the character image formed on the solid color background image. More specifically, because the portion of the solid color background image on which the fine-line image and the character image were formed with the transparent toner was higher than other areas without the fine-line image and the character image. Due to the height difference, the recording medium could not contact tightly around the fine-line image and the character image with the transparent toner in the solid color background image. As a result, the color toner such as yellow, magenta, cyan, and black could not transfer well from the intermediate transfer member onto the recording medium. Thus, inadequate transfer of toner occurred around the line image and the character image.

Although it was not as visible as the dropouts around the fine-line image and the character image, the present inventors also found inadequate transfer of toner around the image supplied solidly with the transparent toner. However, such an area around the image formed with the transparent toner may be a non-image formation area to which no toner is supplied and an image area having multiple colors such as a photo image in which such dropouts are not visible. Improper transfer of toner such as dropouts appeared especially noticeable when an image including a fine-line image and a character image was formed on a solid color background image. Moreover, dropouts also occurred when forming a fine-line image and a character image with color toner on a solid color background image.

In view of the above, in one approach, a superimposed bias in which an alternating current (AC) component is superimposed on a direct current (DC) component is employed as a secondary transfer bias to form a transfer electric field in the secondary transfer nip. In order to facilitate an understanding of the related art and of the novel features of the present invention, with reference to FIGS. 3 through 5, a description is provided of principles of toner movement when applied with the superimposed bias according to an experiment performed by the present inventors.

FIG. 3 illustrates movement of toner in the transfer nip in a test machine at the beginning of transfer. As illustrated in FIG. 3, a polyimide belt 214 of the test machine serves as an intermediate transfer member that carries a color toner image on its image bearing surface. The color toner image includes a fine-line image formed of toner particles Ty of yellow toner and a solid color background image formed of toner particles of Tc of cyan toner. The fine-line image and the solid color background image are superimposed one atop the other. Because the transparent toner particles are difficult to see, in the experiment, the toner particles Ty instead of the transparent toner particles were used to form the fine-line image. The toner particles Ty and Tc were negatively chargeable toner particles.

A portion of the color image including the fine-line image with the toner particles Ty and the solid color background image with the toner particles Tc superimposed on the fine-line image contacted tightly a transparent substrate 210. In the experiment, the transparent substrate 210 corresponds to a recording medium.

As illustrated in FIG. 3, the portion of the solid color background image of the toner particles Tc superimposed on the toner particles Ty of the fine-line image contacted tightly the transparent substrate 210. By contrast, there was a gap between the transparent substrate 210 and the portion of the solid color background image where the toner particles Tc were not superimposed on the toner particles Ty of the fine-line image.

In this state, when the secondary transfer bias consisting of the DC component having a positive polarity superimposed on the AC component was applied to the polyimide belt 214, some toner particles Tc separated from the toner layer of toner particles Tc (hereinafter referred to as toner layer C) that had not contacted the transparent substrate 210. As a result, the separated toner particles Tc moved back and forth between the toner layer C and the transparent substrate 210. The cycle of the back-and-forth movement of the toner particles was in sync with the cycle of the AC component of the secondary transfer bias.

As illustrated in FIG. 3, in the first cycle, only a small amount of toner particles Tc separated from the toner layer C. The separated toner particles Tc made one back-and-forth movement between the toner layer C and the transparent substrate 210. In this process, the returning toner particles Tc collided with other toner particles Tc remaining in the toner layer C, thereby reducing adhesion of the other toner particles to the toner layer C or to the transparent substrate 210. As a result, in the next cycle, a larger amount of toner particles than in the previous cycle separated from the toner layer C, as illustrated in FIG. 5.

Subsequently, the separated toner particles Tc made one back-and-forth movement between the toner layer C and the transparent substrate 210. Again, the returning toner particles Tc collided with other toner particles remaining in the toner layer C, thereby enhancing separation of the toner particles Tc from the toner layer. As a result, in the next cycle, an even larger amount of toner particles than in the previous cycle separated from the toner layer.

With this configuration, as the toner particles Tc moved back and forth, the amount of toner particles separating from the toner layer increased, and lastly, a sufficient amount of toner particles Tc moved to the transparent substrate 210 which corresponds to a recording medium. A sufficient image density was obtained around the fine-line image in the solid color background image.

Although advantageous and generally effective for its intended purpose, application of the superimposed bias as the secondary transfer bias causes scattering of toner easily. As the toner particles are moved back and forth between the intermediate transfer member and the recording medium in the secondary transfer nip, the toner particles scatter and stick undesirably to a non-image formation area of the recording medium. In a case in which the secondary transfer bias consisting of the superimposed bias for preventing dropouts is applied even when forming an image without a fine-line and a character image on a solid color background image, scattering of toner still occurs.

In view of the above, there is demand for an image forming apparatus that is capable of preventing inadequate transfer of toner while preventing scattering of toner.

SUMMARY OF THE INVENTION

In view of the foregoing, in an aspect of this disclosure, there is provided an improved image forming apparatus including a plurality of image bearing members, an intermediate transfer member, and a transfer device. The plurality of image bearing members bears a toner image on a surface thereof. The intermediate transfer member is disposed facing the plurality of image bearing members, and toner images formed on the plurality of image bearing members are transferred thereon such that they are superimposed one atop the other, thereby forming a composite toner image. The transfer device transfers the composite toner image formed on the intermediate transfer belt onto a recording medium. The transfer device includes a nip forming member to contact the intermediate transfer member to form a transfer nip and a transfer bias output device to output a transfer bias to form a transfer electric field in the transfer nip. Upon transfer of the composite toner image including a particular toner image onto the recording medium in the transfer nip, the transfer bias output device outputs the transfer bias including a first superimposed bias in which a direct current (DC) component is superimposed on an alternating current (AC) component. Upon transfer of the composite toner image without the particular toner image onto the recording medium in the transfer nip, the transfer bias output device outputs one of the transfer bias including a second superimposed bias having a peak-to-peak value of the AC component smaller than that of the first superimposed bias and the transfer bias including only the DC component.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 1 is a photo image of inadequate transfer of toner around character images formed with a transparent toner;

FIG. 2 is a photo image of inadequate transfer of toner around fine lines formed with the transparent toner;

FIG. 3 is an enlarged schematic diagram illustrating behavior of toner at the beginning of transfer of a toner image;

FIG. 4 is an enlarged schematic diagram illustrating behavior of toner in the middle phase of transfer;

FIG. 5 is an enlarged schematic diagram illustrating behavior of toner in the last phase of transfer;

DETAILED DESCRIPTION OF THE INVENTION

Figure 6:
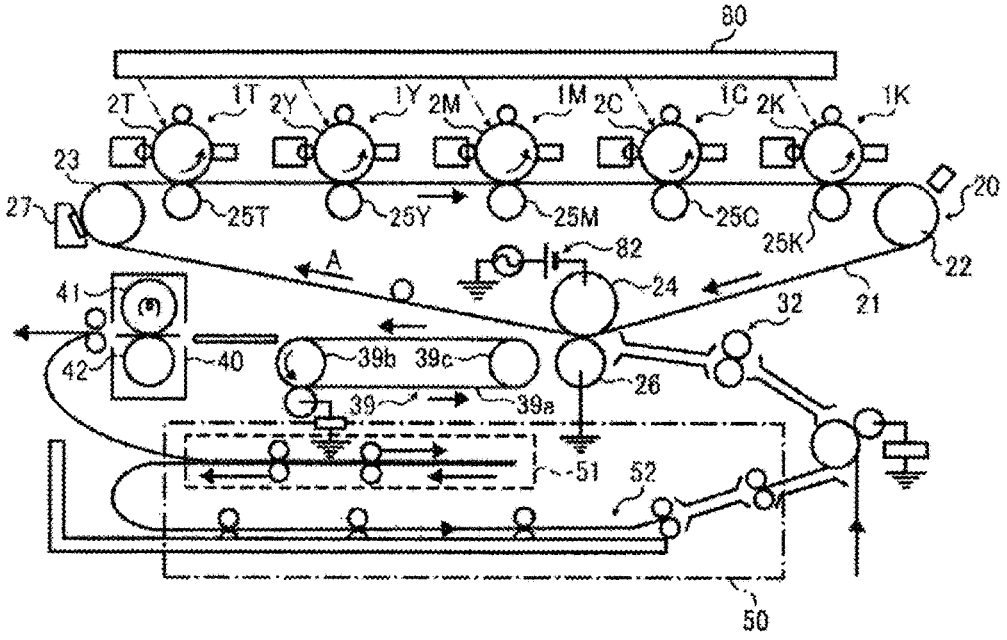
FIG. 6 is a schematic diagram illustrating a printer as an example of an image forming apparatus according to an illustrative embodiment of the present invention.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, a description is provided of an image forming apparatus according to an aspect of this disclosure.

With reference to FIG. 6, a description is provided of a tandem-type color printer as an example of an image forming apparatus. FIG. 6 is a schematic diagram illustrating the image forming apparatus.

As illustrated in FIG. 6, the image forming apparatus includes five image forming units 1T, 1Y, 1M, 1C, and 1K for forming toner images, one for each of transparent and the colors yellow, magenta, cyan, and black, respectively, a transfer unit 20, an optical writing unit 80, a fixing device 40, a sheet conveyer 39, and a duplex printing unit 50.

It is to be noted that the suffixes T, Y, M, C, and K denote transparent, yellow, magenta, cyan, and black, respectively. To simplify the description, these suffixes T, Y, M, C, and K indicating colors are omitted herein, unless otherwise specified.

The five image forming units 1T, 1Y, 1M, 1C, and 1K all have the same configuration as all the others, differing only in the color of toner employed. Thus, with reference to FIG.

2, a description is provided of the image forming unit 1K for forming a toner image of black as a representative example of the image forming units 1. The image forming units 1T, 1Y, 1M, 1C, and 1K are replaced upon reaching their product life cycles.

FIG. 2 is a schematic diagram illustrating the image forming unit 1K. A photosensitive drum 2K serving as a latent image bearing member is surrounded by various pieces of imaging equipment, such as a charging device 4K, a developing device 3K, a drum cleaner 5K, and a charge neutralizer (not illustrated). These devices are held by a common holder so that they are detachably attachable and hence replaceable at the same time.

The photosensitive drum 2K comprises a drum-shaped base on which an organic photoconductive layer is disposed, with the external diameter of approximately 60 mm. The photosensitive drum 2K is rotated in a counterclockwise direction by a driving device. The charging device 4K includes a charging roller 4aK supplied with a charging bias. The charging roller 4aK contacts or approaches the photosensitive drum 2K to generate electrical discharge therebetween, thereby charging uniformly the surface of the photosensitive drum 2K.

According to the present illustrative embodiment, the photosensitive drum 2K is uniformly charged with a negative polarity which is the same polarity as the normal charge on toner. As the charging bias, an alternating current (AC) voltage superimposed on a direct current (DC) voltage is employed. The charging roller 4aK is formed of a metal core covered with a conductive elastic layer made of conductive elastic material. According to the present illustrative embodiment, the photosensitive drum 2K is charged by the charging roller 4aK contacting the photosensitive drum 2K or disposed near the photosensitive drum 2K. Alternatively, a corona charger may be employed.

The uniformly charged surface of the photosensitive drum 2K is scanned by a light beam projected from the optical writing unit 80 of FIG. 1, thereby forming an electrostatic latent image for black on the surface of the photosensitive drum 2K. The electrostatic latent image for black on the photosensitive drum 2K is developed with black toner by the developing device 3K. Accordingly, a visible image, also known as a toner image, of black, is formed. As will be described later, the toner image is transferred primarily onto an intermediate transfer belt 21.

The drum cleaner 5K removes residual toner remaining on the photosensitive drum 2K after the primary transfer process, that is, after the photosensitive drum 2K passes through a primary transfer nip at which the intermediate transfer belt 21 contacts the photosensitive drum 2K. The drum cleaner 5K includes a brush roller 5aK and a cleaning blade 5bK. The cleaning blade 5bK is cantilevered, that is, one end thereof is fixed to a housing of the drum cleaner 5K, and its free end opposite the cantilevered portion contacts the surface of the photosensitive drum 2K. The brush roller 5aK rotates and brushes off the residual toner from the surface of the photosensitive drum 2K while the cleaning blade 5bK removes the residual toner by scraping. It is to be noted that the cantilevered side of the cleaning blade 5bK is positioned downstream from its free end contacting the photosensitive drum 2K in the direction of rotation of the photosensitive drum 2K so that the free end of the cleaning blade 5K faces or becomes counter to the direction of rotation.

The charge neutralizer removes residual charge remaining on the photosensitive drum 2K after the surface thereof is cleaned by the drum cleaner 5K in preparation for the subsequent imaging cycle. The surface of the photosensitive drum 2K is initialized.

The developing device 3K includes a developing section including a developing roller 3aK and a developer conveyer including a first screw 3bK and a second screw 3cK. The developer conveyer mixes a black developing agent and feeds the developing agent to the developing roller 3aK. The developer conveyer includes a first chamber equipped with the first screw 3bK and a second chamber equipped with the second screw 3cK. The first screw 3bK and the second screw 3cK are each constituted of a rotatable shaft and helical flighting wrapped around the circumferential surface of the shaft. Each end of the shaft of the first screw 3bK and the second screw 3cK in the axial direction is rotatably held by shaft bearings.

The first chamber with the first screw 3bK and the second chamber with the second screw 3cK are separated by a wall, but each end of the wall in the direction of the screw shaft has a connecting hole through which the first chamber and the second chamber are connected.

The first screw 3bK mixes the developing agent by rotating the helical flighting and carries the developing agent from the distal end to the proximal end of the screw in the direction perpendicular to the surface of the recording medium while rotating. The first screw 3bK is disposed parallel to and facing the developing roller 3aK. Hence, the developing agent is delivered along the axial (shaft) direction of the developing roller 3aK. The first screw 3bK supplies the developing agent to the surface of the developing roller 3aK along the direction of the shaft line of the developing roller 3aK.

The developing agent transported near the proximal end of the first screw 3bK passes through the connecting hole in the wall near the proximal side and enters the second chamber. Subsequently, the developing agent is carried by the helical flighting of the second screw 3cK. As the second screw 3cK rotates, the developing agent is delivered from the proximal end to the distal end in FIG. 7 while being mixed in the direction of rotation.

In the second chamber, a toner density detector for detecting the density of toner in the developing agent is disposed at the bottom of a casing of the chamber. As the toner density detector, a magnetic permeability detector is employed. There is a correlation between the toner density (in this example, black toner) and the magnetic permeability of the developing agent consisting of the toner and a magnetic carrier. Therefore, the magnetic permeability detector can detect the density of the toner.

Although not illustrated, each of the second chambers of the developing devices 3 includes a toner supply device to supply independently transparent toner T and the color toners Y, M, C, and K, to the respective photosensitive drums 2T, 2Y, 2M, 2C and 2K. A control unit of the image forming apparatus includes a Random Access Memory (RAM) to store a target output voltage Vtref for output voltages provided by the toner density detectors for transparent, yellow, magenta, cyan, and black toners. If the difference between the output voltages provided by the toner detectors for transparent, yellow, magenta, cyan, and black toners, and the target value Vtref for each color exceeds a predetermined value, the toner supply devices are driven for a predetermined time period associated with the difference so as to supply a proper amount of toner. Accordingly, the respective color of toner is supplied to the second chamber of the developing device 3.

The developing roller 3aK in the developing section of the developing device 3K faces the first screw 3bK as well as the photosensitive drum 2K through an opening formed in the casing of the developing device 3K. The developing roller 3aK comprises a developing sleeve made of a non-magnetic pipe which is rotated, and a magnetic roller disposed inside the developing sleeve such that the magnetic roller is fixed to prevent the magnetic roller from rotating together with the developing sleeve. The developing agent supplied from the first screw 3bK is carried by the surface of the developing sleeve due to the magnetic force of the magnetic roller. As the developing sleeve rotates, the developing agent is transported to a developing area facing the photosensitive drum 2K.

The developing sleeve is supplied with a developing bias having the same polarity as the toner. The developing bias is greater than the bias of the electrostatic latent image on the photosensitive drum 2K, but less than the charge potential of the photosensitive drum 2K. With this configuration, a developing potential that causes the toner on the developing sleeve to move electrostatically to the electrostatic latent image on the photosensitive drum 2K acts between the developing sleeve and the electrostatic latent image on the photosensitive drum 2K.

A non-developing potential acts between the developing sleeve and a background portion or a non-image formation area of the photosensitive drum 2K, causing the toner on the developing sleeve to move to the sleeve surface. Due to the developing potential and the non-developing potential, the toner on the developing sleeve moves selectively to the electrostatic latent image formed on the photosensitive drum 2K, thereby developing the electrostatic latent image into a visible image, known as a toner image of black color.

In FIG. 6, similar to the image forming unit 1K, in the image forming units 1T, 1Y, 1M, and 1C, toner images of transparent, yellow, magenta, and cyan are formed on the photosensitive drums 2T, 2Y, 2M, and 2C, respectively.

The optical writing unit 80 for writing a latent image on the photosensitive drums 2 is disposed above the image forming units 1T, 1Y, 1M, 1C, and 1K. Based on image information received from external devices such as a personal computer (PC), the optical writing unit 80 illuminates the photosensitive drums 2T, 2Y, 2M, 2C, and 2K with a light beam projected from a laser diode of the optical writing unit 80. Accordingly, the electrostatic latent images of transparent (T), yellow (y), magenta (m), cyan (c), and black (k) are formed on the photosensitive drums 2T, 2Y, 2M, 2C, and 2K, respectively. For example, the potential of the portion of the uniformly-charged surface of the photosensitive drum 2K illuminated with the light beam is attenuated. As a result, the potential of the illuminated portion of the photosensitive drum 2K with the light beam is less than the potential of the other area, that is, the background portion (non-image formation area), thereby forming an electrostatic latent image on the surface of the photosensitive drum 2K.

Although not illustrated, the optical writing unit 80 includes a polygon mirror, a plurality of optical lenses, and mirrors. The light beam projected from the laser diode serving as a light source is deflected in a main scanning direction by the polygon mirror rotated by a polygon motor. The deflected light, then, strikes the optical lenses and mirrors, thereby scanning the photosensitive drum 2. Alternatively, the optical writing unit 80 may employ a light source using an LED array including a plurality of LEDs that projects light.

Still referring to FIG. 6, a description is provided of the transfer unit 20. The transfer unit 20 is disposed below the image forming units 1T, 1Y, 1M, 1C, and 1K. The transfer unit 20 includes the intermediate transfer belt 21 serving as an image bearing member formed into an endless loop and entrained about a plurality of rollers, thereby rotating endlessly in the counterclockwise direction indicated by an arrow A. The transfer unit 20 also includes a driving roller 22, a follower roller 23, a secondary transfer opposing roller 24, five primary transfer rollers 25T, 25Y, 25M, 25C, and 25K, a secondary transfer roller 26 serving as a nip forming member, a belt cleaner, and so forth.

The intermediate transfer belt 21 is entrained around and stretched taut by the driving roller 22, the follower roller 23, the secondary transfer opposing roller 24, and the primary transfer rollers 25T, 25Y, 25M, 25C, and 25K, which are all disposed inside the loop formed by the intermediate transfer belt 21. The driving roller 22 is rotated in the counterclockwise direction by a motor or the like, and rotation of the driving roller 22 enables the intermediate transfer belt 21 to rotate in the same direction.

The intermediate transfer belt 21 has a thickness in a range of from 20 μm to 200 μm, preferably, approximately 60 μm. The volume resistivity thereof is in a range of from 1E6 [Ωcm] to 1E12 [Ωcm], preferably, approximately 1E9 [Ωcm]. The volume resistivity is measured with an applied voltage of 100V by a high resistivity meter, Hiresta UPM-CPHT 45 manufactured by Mitsubishi Chemical Corporation. The intermediate transfer belt 21 is made of resin such as polyimide resin in which carbon black is dispersed.

The intermediate transfer belt 21 is interposed between the photosensitive drums 2T, 2Y, 2M, 2C, and 2K, and the primary transfer rollers 25T, 25Y, 25M, 25C, and 25K. Accordingly, the primary transfer nip is formed between the front surface or the image bearing surface of the intermediate transfer belt 21 and the photosensitive drums 2T, 2Y, 2M, 2C, and 2K. A primary transfer power source 81 (shown in FIG. 12) applies to the primary transfer rollers 25T, 25Y, 25M, 25C, and 25K a primary transfer bias having the opposite polarity to the charge on the toner. Accordingly, a primary transfer electric field is formed between the primary transfer rollers 25T, 25Y, 25M, 25C, and 25K, and the toner images of transparent, yellow, magenta, cyan, and black formed on the photosensitive drums 2T, 2Y, 2M, 2C, and 2K.

The transparent toner image formed on the surface of the photosensitive drum 2T enters the primary transfer nip as the photosensitive drum 2T rotates. Subsequently, the transparent toner image is transferred from the photosensitive drum 2T to the intermediate transfer belt 21 due to the transfer electrical field and the nip pressure. As the intermediate transfer belt 21, onto which the transparent toner image is primarily transferred, passes through the primary transfer nips of yellow, magenta, cyan, and black, accordingly, the toner images on the photosensitive drums 2Y, 2M, 2C, and 2K are transferred on the transparent toner image which has been transferred on the intermediate transfer belt 21, thereby forming a composite toner image on the intermediate transfer belt 21 in the primary transfer process. With this configuration, the composite toner image including the color toner image superimposed on the transparent toner image is formed on the intermediate transfer belt 21 in the primary transfer process.

Each of the primary transfer rollers 25T, 25Y, 25M, 25C, and 25K is constituted of a metal core and a conductive sponge layer disposed on the metal core. The outer diameter of the primary transfer rollers 25T, 25Y, 25M, 25C, and 25K is approximately 16 mm. The diameter of the metal core thereof is approximately 10 mm. The resistance of the sponge layer is measured such that a metal roller having an outer diameter of 30 mm is pressed against the sponge layer at a load of 10N and a voltage of 1000V is supplied to the metal core of the primary transfer roller. Then, the resistance is obtained by Ohm's law R=V/I, where V is a voltage, I is a current, and R is a resistance.

The obtained resistance R of the sponge layer is approximately 3E7 [Ω]. The primary transfer bias under constant current control is applied to the primary transfer rollers 25T, 25Y, 25M, 25C, and 25K from the primary transfer power source. According to the present illustrative embodiment, a roller-type primary transfer device is used as the primary transfer rollers 25T, 25Y, 25M, and 25K. Alternatively, a transfer charger and a brush-type transfer device may be employed as the primary transfer device.

The secondary transfer roller 26 of the transfer unit 20 is disposed outside the loop formed by the intermediate transfer belt 21, opposite the secondary transfer opposing roller 24 which is disposed inside the looped intermediate transfer belt 21. The intermediate transfer belt 21 is interposed between the secondary transfer roller 26 and the secondary transfer opposing roller 24. Accordingly, the peripheral surface or the image bearing surface of the intermediate transfer belt 21 contacts the secondary transfer roller 26 serving as the nip forming roller 26, thereby forming a secondary transfer nip therebetween.

The secondary transfer roller 26 is grounded. A secondary transfer bias power source 82 applies to the secondary transfer opposing roller 24 a secondary transfer bias. With this configuration, a secondary transfer electric field is formed between the secondary transfer opposing roller 24 and the secondary transfer roller 26 so that the toner having a negative polarity is transferred electrostatically from the secondary transfer opposing roller side to the secondary transfer roller side.

Although not illustrated, the image forming apparatus includes a sheet cassette. In the sheet cassette, a stack of recording media sheets is stored, and a sheet feed roller of the sheet cassette contacts the top sheet of the stack of the recording media. As the sheet feed roller is rotated by a driving device, the top sheet is fed to a sheet passage in the image forming apparatus.

Substantially at the end of the sheet passage, a pair of registration rollers 32 is disposed. The pair of the registration rollers 32 stops rotating temporarily as soon as the recording medium is interposed therebetween. The pair of registration rollers 32 starts to rotate again to feed the recording medium to the secondary transfer nip in appropriate timing such that the recording medium is aligned with the composite toner image formed on the intermediate transfer belt 21 in the secondary transfer nip. The composite toner image on the intermediate transfer belt 21 is transferred onto the recording medium in the secondary transfer nip by the secondary transfer bias and the nip pressure. After the secondary transfer process, the recording medium, on which the composite toner image is formed, passes through the secondary transfer nip and separates from the secondary transfer roller 26 and the intermediate transfer belt 21.

The secondary transfer opposing roller 24 includes a metal core on which a conductive NBR rubber layer is disposed. The outer diameter of the secondary transfer opposing roller 24 is approximately 24 mm. The diameter of the metal core is approximately 16 mm. The resistance R of the conductive NBR rubber layer is in a range of from 1E6 [Ω] to 1E12 [Ω], preferably, approximately 4E7 [Ω]. The resistance R is measured using the same method as the primary transfer roller 25 described above.

The secondary transfer roller 26 includes a metal core on which a conductive NBR rubber layer is disposed. The outer diameter of the secondary transfer roller 26 is approximately 24 mm. The diameter of the metal core is approximately 14 mm. The resistance R of the conductive NBR rubber layer is equal to or less than 1E6 [Ω]. The resistance R is measured using the same method as the primary transfer roller 25 described above.

According to the present illustrative embodiment, the secondary transfer bias power source 82 includes a direct current (DC) power source and an alternating current (AC) power source, and can output an AC voltage superimposed on a DC voltage as the secondary transfer bias. An output terminal of the secondary transfer bias power source 82 is connected to the metal core of the secondary transfer opposing roller 24. The potential of the metal core of the secondary transfer opposing roller 24 has almost the same value as the output voltage of the secondary transfer bias power source 82.

As for the secondary transfer roller 26, the metal core thereof is grounded. According to the present illustrative embodiment, the metal core of the secondary transfer roller 26 is grounded while the superimposed bias is applied to the metal core of the secondary transfer opposing roller 24.

Alternatively, the metal core of the secondary transfer opposing roller 24 may be grounded while the superimposed bias is applied to the metal core of secondary transfer roller 26. In this case, the polarity of the DC voltage is changed.

More specifically, as illustrated in FIG. 6, in a case in which the superimposed bias is applied to the secondary transfer opposing roller 24 while toner having a negative polarity is used and the secondary transfer roller 26 is grounded, the DC voltage having the same negative polarity as the toner is used so that a time-averaged potential of the superimposed bias has the same negative polarity as the toner. By contrast, when the secondary transfer opposing roller 24 is grounded and the superimposed bias is applied to the secondary transfer roller 26, the DC voltage having the positive polarity, which is opposite that of the toner, is used so that the time-averaged potential of the superimposed bias has the positive polarity opposite that of the toner.

Alternatively, instead of applying the superimposed bias to the secondary transfer roller 26 or to the secondary transfer opposing roller 24, the DC voltage is supplied to one of the secondary transfer roller 26 and the secondary transfer opposing roller 24, and the AC voltage is supplied to another of the secondary transfer roller 26 and the secondary transfer opposing roller 24. According to the present illustrative embodiment, the AC voltage having a sinusoidal waveform is used. Alternatively, an AC voltage having a non-sinusoidal wave may be used.

After the intermediate transfer belt 21 passes through the secondary transfer nip, residual toner not having been transferred onto the recording medium remains on the intermediate transfer belt 21. The residual toner adhered to the intermediate transfer belt 21 is removed from the intermediate transfer belt 21 by a belt cleaning device 27. The belt cleaning device 27 includes a cleaning blade which contacts the surface of the intermediate transfer belt 21 to remove the residual toner therefrom.

As illustrated in FIG. 6, the sheet conveyer 39 is disposed substantially near the end of the secondary transfer nip. The sheet conveyer 39 includes a conveyance belt 39a, a drive roller 39b, and a follower roller 39c. The conveyance belt 39a is formed into a loop and entrained about the drive roller 39b and the follower roller 39c, thereby stretching the conveyance belt 39a in the horizontal direction. The conveyance belt 39a is rotated in the counterclockwise direction. The recording medium passing through the secondary transfer nip is absorbed to the surface of the conveyance belt 39a and delivered from the right to the left in FIG. 6 as the conveyance belt 39a moves. When the recording medium arrives at a belt entrained area at which the conveyance belt 39a is entrained about the drive roller 39b, the recording medium separates from the conveyance belt 39a.

Subsequently, the recording medium is delivered to the fixing device 40. The fixing device 40 includes a fixing roller 41 and a pressing roller 42 pressing against the fixing roller 41. The fixing roller 41 includes a heat source such as a halogen lamp inside thereof. While rotating, the pressing roller 42 pressingly contacts the fixing roller 41, thereby forming a heated area called a fixing nip therebetween. At the fixing nip, heat and pressure are applied to the toner image on the recording medium so that the toner in the toner image is fused and affixed to the recording medium. When fusing the toner, the heat source is turned on and off such that the fixing temperature, which is a surface temperature of the fixing roller 41, is maintained at approximately 165 deg. C. constantly. After the fixing process, the recording medium is discharged outside the image forming apparatus via a sheet passage.

The recording medium output from the fixing device 40 is sent either to a pair of sheet output rollers or to the duplex printing unit 50. More specifically, in a single-side print mode in which an image is formed only on one side of the recording medium, the recording medium output from the fixing device 40 is sent to the pair of the sheet output rollers. By contrast, in a duplex print mode in which an image is formed on both sides of the recording medium, the recording medium bearing a toner image on one side (here, a first side) output from the fixing device 40 is sent to the duplex printing unit 50, instead of the sheet output rollers so that an image is formed on the other side (a second side) of the recording medium. However, if the recording medium output from the fixing device 40 bears an image on both sides, the recording medium is sent to the sheet output rollers in the duplex print mode.

The direction of conveyance of the recording medium after passing through the fixing device 40 is changed using a switching claw. Accordingly, the recording medium is directed either to the sheet output rollers or to the duplex printing unit 50.

The duplex printing unit 50 includes a first switchback path 51 and a second switchback path 52. In the duplex printing unit 50, the recording medium output from the fixing device 40 is turned over in the first switchback path 51 and then sent to the second switchback path 52. After passing through the second switchback path 52, the recording medium is sent to the sheet passage for delivery of a recording medium from the sheet cassette to the secondary transfer nip. Accordingly, the recording medium, which has been turned over, is sent to the secondary transfer nip again.

After output from the fixing device 40, the recording medium is output onto a sheet output tray with the surface bearing an image facing down by a finisher in the single-side print mode and the duplex print mode. The recording medium is output by the finisher with the surface bearing the image facing down to protect privacy and security.

Figure 8:
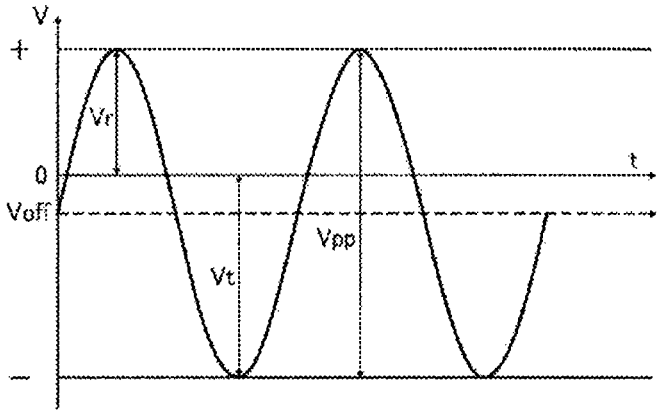
FIG. 8 shows a waveform of a superimposed bias serving as a secondary bias supplied from a secondary transfer bias power source of the image forming apparatus.

With reference to FIG. 8, a description is provided of the secondary transfer bias. FIG. 8 shows an example of a waveform of a superimposed bias serving as the secondary transfer bias output from the secondary transfer bias power source 82.

As described above, the secondary transfer bias is applied to the metal core of the secondary transfer opposing roller 24. When the secondary transfer bias is applied to the metal core of the secondary transfer opposing roller 24, a potential difference is generated between the metal core of the secondary transfer opposing roller 24 and the metal core of the secondary transfer roller 26 serving as the nip forming member. In general, a potential difference is treated as an absolute value. However, in this specification, the potential difference is treated as a value with polarity. More specifically, a value obtained by subtracting the potential of the metal core of the secondary transfer roller 26 from the potential of the metal core the secondary transfer opposing roller 24 is considered as the potential difference.

Using toner having the negative polarity as in the illustrative embodiment, when the polarity of the time-averaged value of the potential difference becomes negative, the potential of the secondary transfer opposing roller 24 is increased beyond the potential of the secondary transfer roller 26 towards the polarity of the charge on the toner (the negative side in the present illustrative embodiment). Accordingly, the toner is electrostatically moved from the secondary transfer opposing roller side to the secondary transfer roller side.

In FIG. 8, an offset voltage Voff corresponds to a value of a DC component of the secondary transfer bias. A peak-to-peak value Vpp corresponds to a peak-to-peak value of an AC component of the secondary transfer bias. According to the present illustrative embodiment, the secondary transfer bias shown in FIG. 8 includes a superimposed voltage of the offset voltage Voff and the peak-to-peak value Vpp as described above. Thus, the time-averaged value of the secondary transfer bias coincides with the value of offset voltage Voff, and the potential of the metal core of the secondary transfer opposing roller 24 itself becomes the potential difference between the potentials of the metal core of the secondary transfer roller 26 and the secondary transfer opposing roller 24. The potential difference between the potentials of the metal core of the secondary transfer roller 26 and the metal core of the secondary transfer opposing roller 24 includes a DC component (Eoff) having the same value as the offset voltage Voff and an AC component (Epp) having the same value as the peak-to-peak value (Vpp).

In FIG. 8, the offset voltage Voff has a negative polarity. When the offset voltage Voff has a negative polarity, the toner having a negative polarity moves from the secondary transfer opposing roller side to the secondary transfer roller side relatively in the secondary transfer nip. If the polarity of the secondary transfer bias is negative so is the polarity of the toner, the toner having a negative polarity is pushed electrostatically from the secondary transfer opposing roller side towards the secondary transfer roller side in the secondary transfer nip. Accordingly, the toner on the intermediate transfer belt 21 is transferred onto the recording medium.

By contrast, if the secondary transfer bias has a polarity opposite that of the toner, that is, the polarity of the secondary transfer bias is positive, the toner having the negative polarity is attracted electrostatically to the secondary transfer opposing roller side from the secondary transfer roller side. Consequently, the toner once transferred to the recording medium is attracted again to the intermediate transfer belt 21.

It is to be noted that because the time-averaged value of the secondary transfer bias (the same value as the offset voltage Voff in the present illustrative embodiment) has a negative polarity, the toner is pushed electrostatically from the secondary transfer opposing roller side to the secondary transfer roller side. In FIG. 8, a return peak potential Vr represents a peak value on the positive side having the polarity opposite that of the toner. In FIG. 8, the offset voltage Voff is the same value as the center value between the highest and the lowest values of the superimposed bias.

Figure 10:
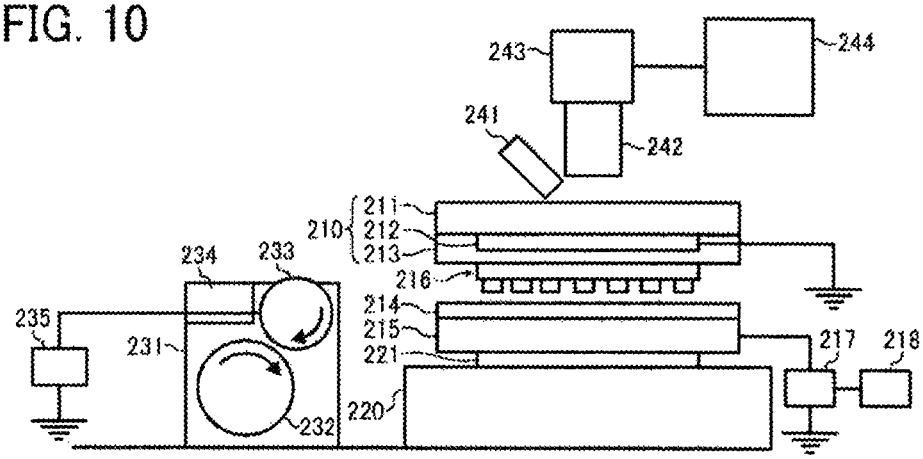
FIG. 10 is a schematic diagram illustrating a test machine for observation of behavior of toner in a secondary transfer nip.

Next, a description is provided of experiments performed by the present inventors. A test machine having the same configurations as the image forming apparatus shown in FIG. 10 was used for the following experiments. Various print tests were performed using the test machine. In the print tests, a developing agent including polyester toner particles and magnetic carrier particles was used. The toner having an average particle diameter of 6.8 μm was produced by a so-called pulverization method. The magnetic carrier having an average particle diameter of 55 μm was coated with a resin layer.

[First Print Test]

The offset voltage Voff was −1.5 kV. More specifically, in this test, the secondary transfer roller 26 was grounded, and a DC component of a superimposed bias serving as a secondary transfer bias was −1.5 kV. A frequency of an AC component was 400 Hz. The following 9 different peak-to-peak values Vpp (kV) of the AC component were employed: 1.0, 2.0, 3.0, 4.0, 5.0, 6.0, 7.0, 8.0, and 9.0 [kV]. A test image was printed out under each of nine peak-to-peak values of the AC component. The test image consisted of a plurality of fine-line patterns superimposed on a solid blue background. The fine-line patterns were produced with a transparent toner.

The tests were performed under laboratory atmospheric conditions at 22° C. and 50% RH (relative humidity). As a recording medium, a sheet of normal paper, i.e. My Paper manufactured by NBS Ricoh Company, Ltd. having a thickness of approximately 90 μm was used. A process linear velocity of the photosensitive drums and the intermediate transfer belt was approximately 282 mm/s.

Figure 9:
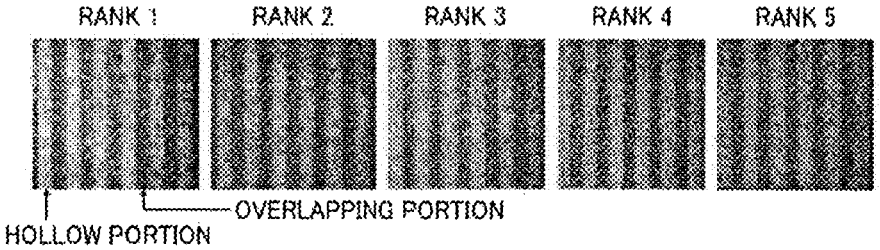
FIG. 9 shows photo images of inadequate transfer of toner at different ranks.

As shown in FIG. 9, inadequate transfer of toner occurred around the fine-line patterns in the output test image was visually graded on a five point scale of 1 to 5, with 5 indicating a degree of inadequate transfer of toner being the lowest and 1 indicating the degree of inadequate transfer of toner being the highest. Rank 3 and above are acceptable levels. Results of the first print test were shown in TABLE 1.

TABLE 1

| Voff [kV] | −1.5 | | | | | | | | |
|---|---|---|---|---|---|---|---|---|---|
| Vpp [kV] | 1.0 | 2.0 | 3.0 | 4.0 | 5.0 | 6.0 | 7.0 | 8.0 | 9.0 |
| RANK OF INADEQUATE TRANSFER OF TONER | 2 | 2 | 2 | 2 | 2 | 3 | 4 | 5 | TRACE OF ELECTRIC DISCHARGE |

As shown in TABLE 1, the greater the peak-to-peak value Vpp of the AC component, the higher the rank of the inadequate transfer of toner. In another test performed by the present inventors, the rank of the inadequate transfer of toner was improved by reducing an absolute value of the offset potential Voff.

The grade of the inadequate transfer of toner was improved by increasing the peak-to-peak value Vpp and hence increasing a transfer peak value Vt of FIG. 8. More specifically, in the experiment, the negatively chargeable toner was used, and the secondary transfer bias was applied to the secondary transfer opposing roller 24, causing the negatively chargeable toner to resist the secondary transfer opposing roller 24 in the secondary transfer nip due to the secondary transfer bias having the negative polarity. Accordingly, the toner was moved electrostatically from the belt side to the sheet side. In other words, when the secondary transfer bias has the negative polarity, the toner in the secondary transfer nip is moved from the belt side to the sheet side. The greater the transfer peak value Vt, the greater the electrostatic force that causes the toner to move from the belt side to the sheet side. Therefore, the rank of the inadequate transfer of toner is improved.

However, if the transfer peak value Vt is too large, the transfer peak value Vt, which is also a potential difference between the secondary transfer roller 26 which is grounded and the secondary transfer opposing roller 24, exceeds a threshold voltage at which electric discharge occurs. As a result, electric discharge occurs between the secondary transfer roller 26 and the secondary transfer opposing roller 24. Due to electric discharge, the toner in the secondary transfer nip is charged reversely so that the toner does not move to the recording medium, leaving a trace of electric discharge in a form of white spots in a resulting image. In the first print test, as shown in TABLE 1, when the peak-to-peak value of Vpp was increased to 9.0 kV, the electric discharge appeared in the form of white spots in the resulting image.

As shown in TABLE 1, when the peak-to-peak value Vpp was equal to or greater than 6.0 kV, the Rank 3 (acceptable) or above was obtained. Because the offset voltage Voff is −1.5 kV, the acceptable level, that is, the Rank 3 or above can be obtained by employing the secondary transfer bias that satisfies the following condition: $\frac{1}{4}\times Vpp>|Voff|$. In order to make dropouts of toner less visible, preferably, the following condition is satisfied: $\frac{1}{5}\times Vpp>|Voff|$.

As described above, in the experiment, the secondary transfer bias was applied to the metal core of the secondary transfer opposing roller 24 while the metal core of the secondary transfer roller 26 was grounded. Therefore, the potential difference Eoff of the DC component, which is the time-averaged value of the potential different between these rollers, coincides with the level of the offset voltage Voff which is the DC component of the secondary transfer bias. When supplying the DC voltage to the metal core of the secondary transfer roller 26, instead of connecting the metal core of the secondary transfer roller 26 to ground, the superimposed voltage including the DC voltage supplied to the metal core of the secondary transfer opposing roller 24 and the DC voltage supplied to the metal core of the secondary transfer roller 26 is treated as the offset voltage Voff. In other words, even when the DC voltage is supplied to the metal core of the secondary transfer roller 26, instead of connecting the secondary transfer roller 26 to ground, the value of Eoff and the offset voltage Voff have the same value.

In a case in which the AC bias having a sinusoidal waveform is employed, such as in the print test and the present illustrative embodiment, the offset voltage Voff has the same value as the average potential Vave of the superimposed bias serving as the secondary transfer bias per unit time.

There are, for example, six ways to generate the potential difference including the DC component and the AC component between a nip forming member such as the secondary transfer roller 26 and an electrode such as the secondary transfer opposing roller 24.

1. A superimposed bias is applied to the nip forming member while the electrode is grounded.

2. A superimposed bias is applied to the nip forming member while applying a DC bias to the electrode.

3. An AC bias including only an AC component is applied to the nip forming member while applying a DC bias to the electrode.

4. The nip forming member is grounded while applying a superimposed bias to the electrode.

5. A DC bias is applied to the nip forming member while applying a superimposed bias to the electrode.

6. A DC bias is applied to the nip forming member while applying an AC bias including only an AC component to the electrode.

[Second Print Test]

In the second print test, similar to the first print test, a test image was output under the following conditions. Offset voltage Voff was −1.5 kV. Peak-to-peak value Vpp was 7.0 kV. The frequency was 400 kV. It is to be noted that the process linear velocity was increased gradually from 282 mm/s, and the degree of inadequate transfer of toner was graded at each process linear velocity. Then, when the process linear velocity was reduced to a certain speed, the degree of inadequate transfer of toner was graded as 2 or below. Similarly, the degree of inadequate transfer of toner was graded as 2 or below, when the frequency was reduced to a certain frequency while the process linear velocity was constant.

In view of the above, it is necessary to move toner back and forth for several times by the alternating electric field in the secondary transfer nip. Otherwise, the toner does not get transferred sufficiently from the belt surface to the recording medium. According to the experiment, it was necessary to move the toner back and forth at least twice in the secondary transfer nip.

Next, a description is provided of transfer experiments performed by the present inventors. The present inventors performed the experiments to find out the reason why the rank of inadequate transfer of toner was at the acceptable level or higher under the condition of "¼×Vpp>|Voff|".

An observation equipment includes a transparent substrate 210, a metal plate 215, a substrate 221, a developing device 231, a power source 235, a Z stage 220, a light source 241, a microscope 242, a high-speed camera 243, a personal computer 244, a voltage amplifier 217, a waveform generator 218, and so forth. The transparent substrate 210 includes a glass plate 211, a transparent electrode 212 made of Indium Tin Oxide (ITO) and disposed on a lower surface of the glass plate 211, and a transparent insulating layer 213 made of a transparent material covering the transparent electrode 212. The transparent substrate 210 is supported at a predetermined height position by a substrate support.

As the transparent substrate 210, two types of transparent substrates were prepared, and depending on a purpose, one of two types of the transparent substrate was selected and mounted in the test equipment. One example of the transparent substrate included the transparent electrode 212, the entire surface of which constituted an electrode. Another example of the transparent substrate 210 included the transparent electrode 212 with an electrode having a width of 500 μm and an electrode having a width of 1 mm disposed in a comb-like shape.

A substrate support for supporting the transparent substrate 210 is allowed to move in the vertical and horizontal directions in the drawing by a moving assembly. In the illustrated example shown in FIG. 10, the transparent substrate 210 is located above the Z stage 220 including the metal plate 215 placed thereon. The transparent substrate 210 is capable of moving to a position directly above the developing device 231 disposed lateral to the Z stage 220, in accordance with the movement of the substrate support. The transparent electrode 212 of the transparent substrate 210 is connected to a grounded electrode fixed to the substrate support.

Figure 7:
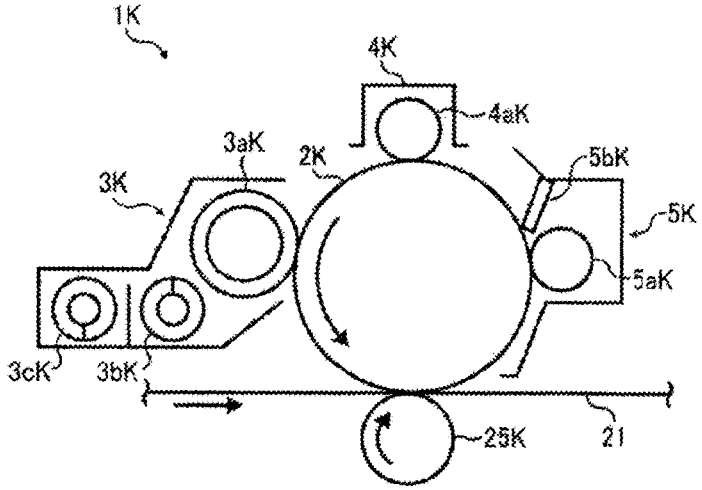
FIG. 7 is a schematic diagram illustrating an image forming unit for black as an example of image forming units employed in the image forming apparatus of FIG. 6.

The developing device 231 is similar in configuration to the developing device 3K illustrated in FIG. 7 according to the illustrative embodiment, and includes a screw 232, a developing roller 233, a doctor blade 234, and so forth. The developing roller 233 is driven to rotate with a development bias applied thereto by the power source 235.

In accordance with the movement of the substrate support, the transparent substrate 210 is moved to a position directly above the developing device 231 at a predetermined speed and disposed opposite the developing roller 233 with a predetermined gap therebetween. Then, toner on the developing roller 233 is transferred to the transparent electrode 212 of the transparent substrate 210. Thereby, a toner layer 216 having a predetermined thickness is formed on the transparent electrode 212 of the transparent substrate 210. The toner adhesion amount per unit area in the toner layer 216 is adjustable by the toner density in the developing agent, the toner charge amount, the development bias value, the gap between the transparent substrate 210 and the developing roller 233, the moving speed of the transparent substrate 210, the rotation speed of the developing roller 233, and so forth.

The transparent substrate 210 on which the toner layer 216 is formed is translated to a position opposite a polyimide belt 214 adhered to the planar metal plate 215 by a conductive adhesive. The metal plate 215 is placed on the substrate 221, which is provided with a load sensor and placed on the Z stage 220. Further, the metal plate 215 is connected to the voltage amplifier 217.

The waveform generator 218 provides the voltage amplifier 217 with a transfer bias including a DC voltage and an AC voltage. The transfer bias is amplified by the voltage amplifier 217 and applied to the metal plate 215. As the Z stage 220 is drive-controlled and elevates the metal plate 215, the polyimide belt 214 starts coming into contact with the toner layer 216. If the metal plate 215 is further elevated, the pressure applied to the toner layer 216 increases. The elevation of the metal plate 215 is stopped when the output from the load sensor reaches a predetermined value.

Figure 11:
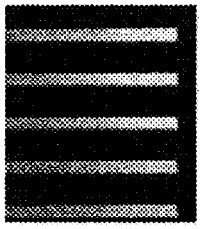
FIG. 11 is a photo image of a line pattern image of yellow in an experiment.

As the transparent substrate 210, the transparent electrode 212 with an electrode having a width of 500 μm and an electrode having a width of 1 mm disposed in a comb-like shape manner were mounted in the test machine. As illustrated in FIG. 11, yellow toner was adhered to the electrode with the width of 500 μm, and a yellow line pattern image was formed. The yellow toner was used instead of a transparent toner which is difficult to be perceived. An average particle diameter of the yellow toner was approximately 6.8 μm. The toner adhesion amount on the electrode was adjusted to approximately 0.7 mg/cm$^2$ in the yellow line pattern image.

While the yellow line pattern image was interposed between the transparent substrate 210 and the polyimide belt 214 with a predetermined pressure, a DC bias was applied to the metal plate 215 to transfer the yellow line pattern image from the transparent substrate 210 to the polyimide belt 214. Subsequently, the polyimide belt 214 and the transparent substrate 210 were separated from one another, and the transparent substrate 210 was changed to another type of the transparent substrate 210 with the transparent electrode 212 having the entire surface constituting a single electrode. Then, the toner of cyan was adhered to the relatively large, single transparent electrode 212 with the toner adhesion amount of 0.8 mg/cm$^2$, and an entirely-solid cyan image (hereinafter simply referred to as solid cyan image) was formed. Subsequently, similar to the yellow line pattern image, the solid cyan image was transferred onto the surface of the polyimide belt 214.

Subsequently, the polyimide belt 214 and the transparent substrate 210 were separated from one another again, and a recording medium (My Paper manufactured by NBS Ricoh Company, Ltd.) was adhered to the transparent substrate 210 with the transparent electrode 212 having the entire surface constituting a single electrode using a conductive double-sided tape. While the transparent substrate 210 was in contact with the polyimide belt 214 again, the transfer bias including the superimposed bias was applied to the metal plate 215 to transfer the solid cyan image and the yellow line pattern image onto the recording medium.

Subsequently, the transparent substrate 210 was separated from the polyimide belt 214, and an amount of the cyan toner remaining (hereinafter referred to residual cyan toner) between the yellow line pattern images on the polyimide belt 214 was graded on a five point scale of 1 to 5 using a subjective evaluation, with 5 indicating the lowest amount of residual cyan toner and 1 indicating the highest amount of residual toner. The amount of residual cyan toner decreases from Rank 1 to Rank 5.

The transfer experiment equipment is configured to apply the transfer bias to a rear surface of the polyimide belt 214. Therefore, in the transfer experiment equipment, the voltage having a polarity opposite that of the image forming apparatus of the illustrative embodiment (that is, a positive polarity) was supplied when transferring the toner from the transparent substrate 210 to the polyimide belt 214. By contrast, when transferring the toner on the polyimide belt 214 onto the recording medium on the surface of the transparent substrate 210, the polarity of the transfer peak value Vt of the superimposed bias was configured to be the same as the polarity of toner, that is, a negative polarity.

When transferring the solid cyan image and the yellow line pattern image on the polyimide belt 214 onto the recording medium, an AC component having a sinusoidal waveform was employed as the AC component of the transfer bias including a superimposed bias. The frequency f of the AC component was set at 500 Hz, and the DC voltage (corresponding to the offset voltage Voff in the illustrative embodiment) was set at −200 V. The level of the peak-to-peak value Vpp was raised gradually from 400 V in increments of 100 V, and experiments were performed under different peak conditions.

As a result, with the peak-to-peak value Vpp less than or equal to 800 V, the rank of the amount of the residual cyan toner was below Rank 4. By contrast, with the peak-to-peak value Vpp greater than or equal to 900 V, the residual cyan toner was graded as Rank 4 or greater. In the transfer experiment equipment, similar to the print test machine, inadequate transfer of toner was improved to the acceptable level under the condition of "$\frac{1}{4}\times Vpp > |Voff|$".

Next, the same experiment was performed with the transparent substrate 210 from which the recording medium was removed. As the transfer bias, an AC voltage having a sinusoidal waveform and the peak-to-peak value Vpp of 800 V superimposed on a DC voltage of −150 V was employed. This transfer bias satisfies the condition of "$\frac{1}{4}\times Vpp > |Voff|$".

Under the above-described condition, the behavior of the toner was photographed with the microscope 242 focused on the surface of the transparent substrate 210 while the transfer bias was applied, and the following phenomenon was observed. The behavior of the toner was examined using the microscope 242 and the high-speed camera 243 disposed above the transparent substrate 210. The transparent substrate 210 is formed of the layers of the glass plate 211, the transparent electrode 212, and the transparent insulating layer 213, which are all made of transparent material. It is therefore possible to observe, from above and through the transparent substrate 210, the behavior of the toner located under the transparent substrate 210.

In the present experiment, a microscope using a zoom lens VH-Z75 manufactured by Keyence Corporation was used as the microscope 242. Further, a camera FASTCAM-MAX 120KC manufactured by Photron Limited was used as the high-speed camera 243 controlled by the personal computer 244. The microscope 242 and the high-speed camera 243 were supported by a camera support. The camera support adjusts the focus of the microscope 242.

The behavior of the toner was photographed as follows. That is, the position at which the behavior of the toner was observed was illuminated with light by the light source 241, and the focus of the microscope 242 was adjusted. Then, a transfer bias was applied to the metal plate 215 to move the toner in the toner layer 216 (the solid cyan image and the yellow line pattern image) adhering to the polyimide belt 214 to the transparent substrate 210. The behavior of the toner in this process was photographed by the high-speed camera 243.

The following behavior was observed. That is, cyan toner particles between the yellow line patterns moved back and forth between the transparent substrate 210 and polyimide belt 214 due to an alternating electric field generated by the AC component of the transfer bias. With an increase in the number of the back-and-forth movements, the amount of cyan toner particles moving back and forth was increased. More specifically, in the transfer nip in the transfer experiment equipment, there was one back-and-forth movement of toner particles in every cycle 1/f of the AC component of the transfer bias due to a single action of the alternating electric field.

As illustrated in FIG. 3, in the first cycle, only cyan toner particles Tc present between the yellow line images on a surface of the cyan toner layer separated from the toner layer. The toner particles then reached the surface of the transparent substrate 210, and thereafter returned to the toner layer between the yellow line images. In this process, the returning cyan toner particles Tc collided with other cyan toner particles Tc remaining in the cyan toner layer, thereby reducing the adhesion of the other cyan toner particles to the toner layer or to the polyimide belt 214. As a result, as illustrated in FIG. 4, in the next cycle, a larger amount of cyan toner particles than in the previous cycle separated from the cyan toner layer.

As described above, the number of cyan toner particles separating from the cyan toner layer was gradually increased in every back-and-forth movement. After the lapse of a nip passage time, that is, the time required for the toner to pass through the secondary transfer nip with the belt (in the transfer experiment equipment, after the time corresponding to the actual nip passage time elapses), a sufficient amount of toner had been transferred between the yellow line images of the recording medium.

It is to be noted that in order to produce the same results as shown in FIGS. 3 through 5, the toner particles need to make at least two back-and-forth movements in the transfer nip. Thus, the nip passage time needs to be at least twice as much as the cycle of the AC component.

[Third Print Test]

It is known that in the test machine used in the experiments, periodic unevenness of image density of the toner image transferred onto the recording medium can be prevented with the process linear velocity V of 282 mm/s, and the frequency f of the AC component of the secondary transfer bias greater than or equal to 400 Hz. The width W of the secondary transfer nip at which the intermediate transfer belt 21 and the secondary transfer roller 26 contact directly in the direction of movement of the secondary transfer roller 26 was approximately 3 mm. Therefore, with the frequency of 400 Hz, approximately 4.26 cycles (3×400/282) of the AC component act on the toner as the toner passes through the secondary transfer nip.

It is understood from the above that it is possible to obtain a favorable image free from periodic unevenness of image density by causing the alternating electric field to act on the toner approximately four times while the toner passes through the secondary transfer nip. That is, in order to obtain a favorable image without periodic unevenness of density a condition of $4<W\times f/v$ needs to be satisfied.

It is to be noted that as the number of back-and-forth movement of the toner in the secondary transfer nip is increased, inadequate transfer of toner around the line image can be prevented. The higher the frequency (f), the more reliably inadequate transfer of toner around the line image can be prevented. However, if the frequency f is too high, toner scatters frequently. For this reason, the frequency f needs not to exceed a certain level.

Figure 12:
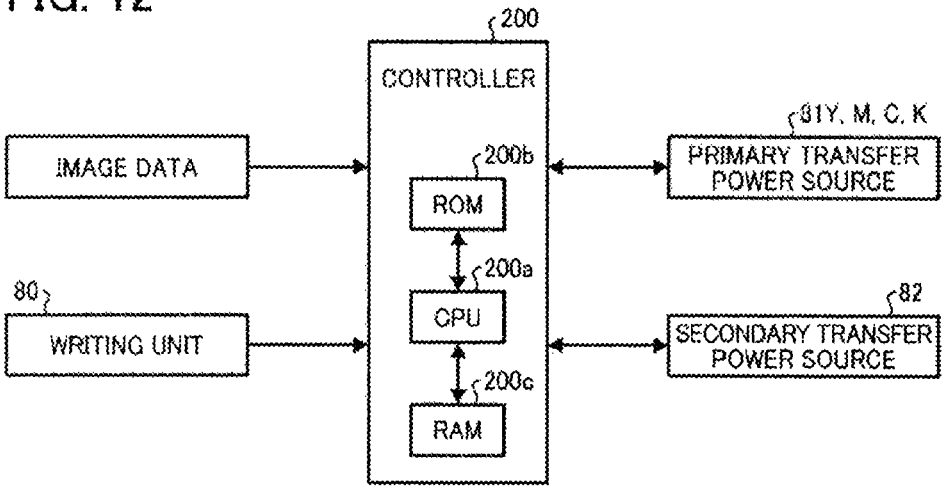
FIG. 12 is a block diagram illustrating a portion of an electrical circuit of the image forming apparatus according to an illustrative embodiment of the present invention.
Figure 13:
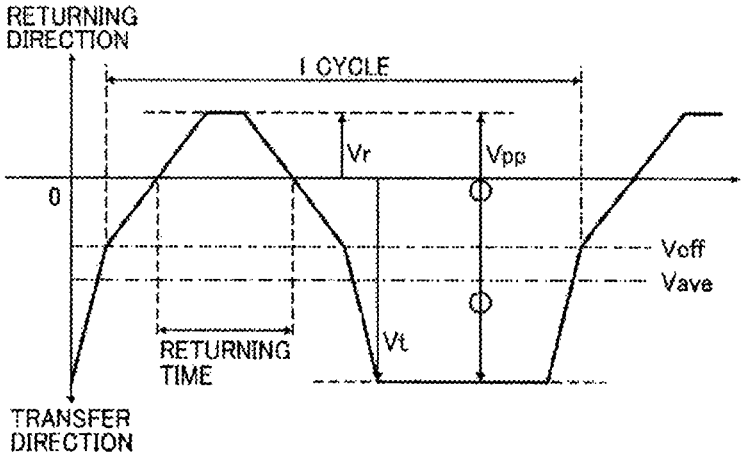
FIG. 13 shows a waveform of a transfer bias in which an average potential Vave is shifted towards a toner transfer polarity side beyond an offset voltage Voff according to a first illustrative embodiment of the present invention.
Figure 14:
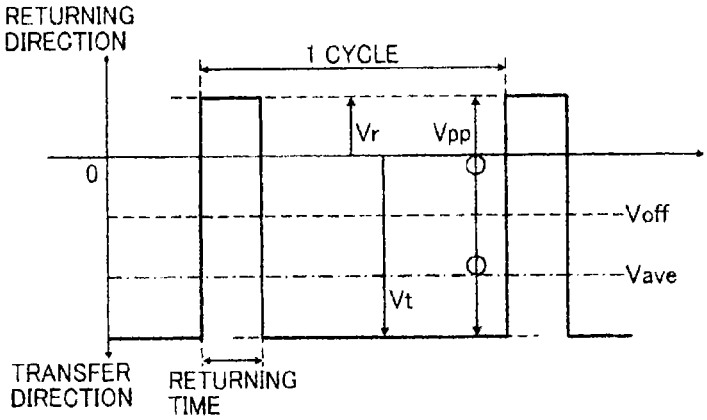
FIG. 14 shows another example of the waveform of the transfer bias in which the average potential Vave is shifted towards the toner transfer polarity side beyond the offset voltage Voff according to a second illustrative embodiment of the present invention.
Figure 15:
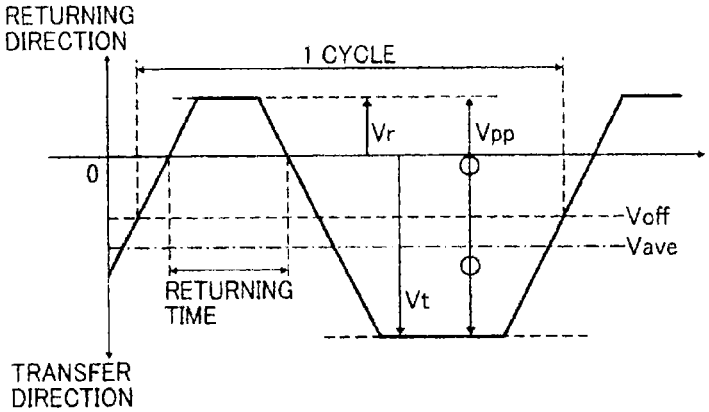
FIG. 15 shows another example of the waveform of the transfer bias in which the average potential Vave is shifted towards the toner transfer polarity side beyond the offset voltage Voff according to a third illustrative embodiment of the present invention.
Figure 16:
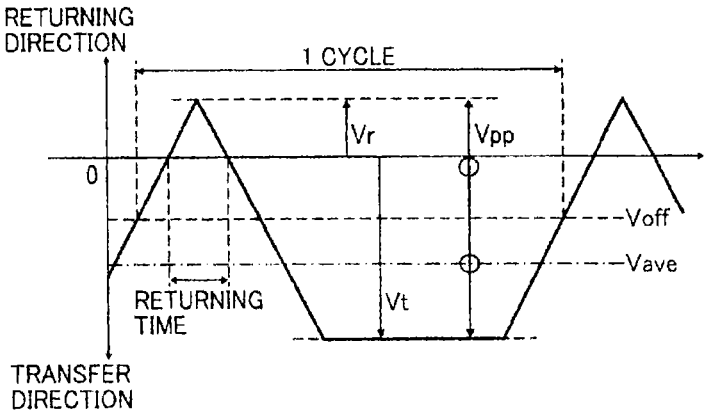
FIG. 16 shows another example of the waveform of the transfer bias in which the average potential Vave is shifted towards the toner transfer polarity side beyond the offset voltage Voff according to a fourth illustrative embodiment of the present invention.
Figure 17:
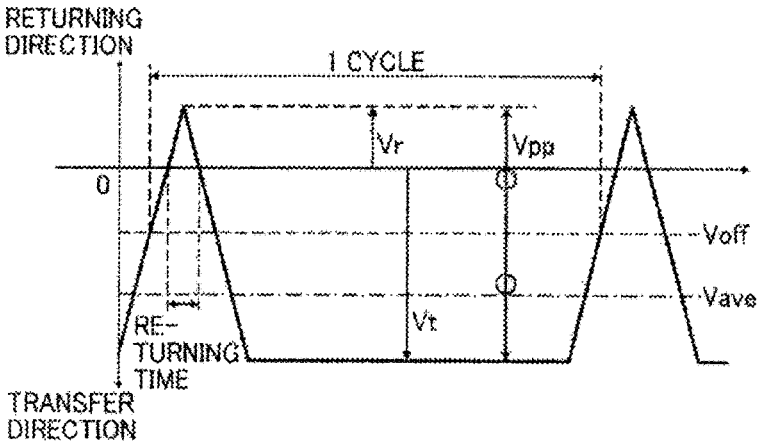
FIG. 17 shows another example of the waveform of the transfer bias in which the average potential Vave is shifted towards the toner transfer polarity side beyond the offset voltage Voff according to a fifth illustrative embodiment of the present invention.
Figure 18:
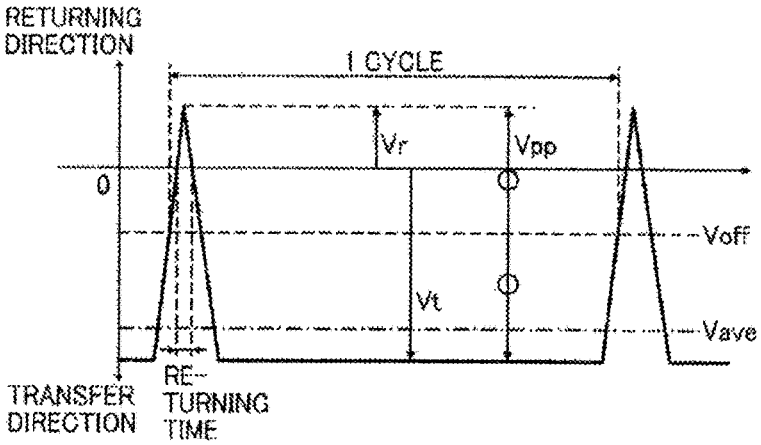
FIG. 18 shows another example of the waveform of the transfer bias in which the average potential Vave is shifted towards the toner transfer polarity side beyond the offset voltage Voff according to a sixth illustrative embodiment of the present invention.
Figure 19:
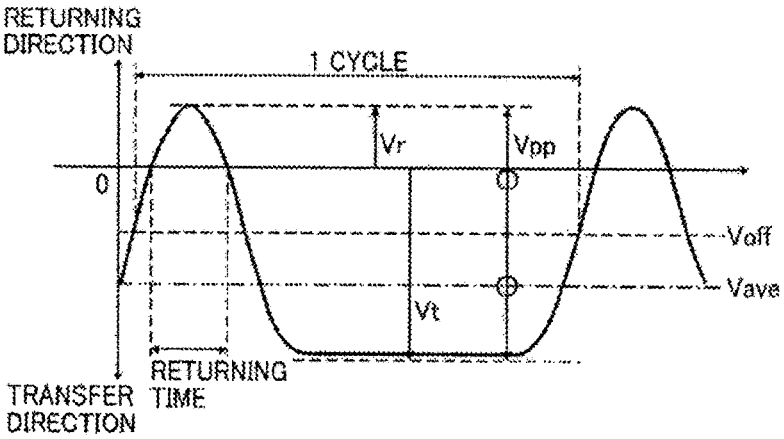
FIG. 19 shows another example of the waveform of the transfer bias in which the average potential Vave is shifted towards the toner transfer polarity side beyond the offset voltage Voff according to a seventh illustrative embodiment of the present invention.

With reference to FIG. 12, a description is provided of a controller 200 of the image forming apparatus. FIG. 12 is a block diagram illustrating a portion of an electrical circuit of the image forming apparatus according to an illustrative embodiment of the present invention. As illustrated in FIG. 12, the controller 200 includes a Central Processing Unit (CPU) 200a serving as an operation device, a Random Access Memory (RAM) 200c serving as a nonvolatile memory, and a Read Only Memory (ROM) 200b serving as a temporary storage device, and so forth.

The controller 200 controls a variety of devices included in the image forming apparatus. Based on a control program stored in the RAM 200c and a ROM 200b, the controller 200 drives each device. For example, the controller 200 outputs a control signal to the secondary transfer power source 82 to control the secondary transfer bias. Then, the secondary transfer power source 82 outputs a secondary transfer bias in accordance with the control signal. In this configuration, a combination of the controller 200 and the secondary transfer power source 82 serves as a transfer bias output device that outputs a secondary transfer bias for forming the secondary transfer electric field.

When transferring secondarily the composite toner image including a particular toner such as the transparent toner image formed on a particular photosensitive drum 2 onto a recording medium in the secondary transfer nip, the controller 200 enables the secondary transfer power source 82 to output the superimposed bias serving as the secondary transfer bias in which the DC component is superimposed on the AC component. By contrast, when transferring secondarily the composite toner image without the transparent toner image onto a recording medium in the secondary transfer nip, the controller 200 enables the secondary transfer power source 82 to output the secondary transfer bias consisting only of the DC voltage.

Improper transfer of toner such as dropouts appears noticeable when an image including fine lines and character images is formed on a solid color background image. Such fine lines and character images on the solid color background are often formed with a toner of a particular color including a special color toner. More specifically, the special color toner has a color which cannot be expressed using yellow, cyan, magenta, and black toners. Such a special color includes, but is not limited to, white, transparent, gold, silver, fluorescent, metallic, pastel, gray, gloss, and foam. In a case in which the composite toner image includes the particular color of toner described above, there is a higher possibility that inadequate transfer of toner such as dropouts occurs around such line images.

In view of the above, when transferring secondarily the composite toner image including, in particular, the transparent toner image onto a recording medium in the secondary transfer nip, the controller 200 enables the secondary transfer power source 82 to output the superimposed bias as the secondary transfer bias to suppress generation of dropouts.

The composite toner image without the transparent toner image often does not include an overlapping portion having fine lines and character images formed on the solid color background image. If the superimposed bias is output from the transfer bias output device when transferring such a composite toner image without the transparent toner image, scattering of toner may be induced.

In view of the above, according to the present illustrative embodiment, when transferring secondarily the composite toner image without the transparent toner image onto a recording medium in the secondary transfer nip, the controller 200 enables the secondary transfer power source 82 to output the secondary transfer bias consisting only of the DC component, thereby preventing scattering of toner.

It is to be noted that a moving force of the toner particles moving back-and-forth between the intermediate transfer belt 21 and the recording medium in the secondary transfer nip is reduced with a smaller peak-to-peak value Vpp of the AC component of the secondary transfer bias, thereby suppressing scattering of toner particles. Therefore, instead of applying the secondary transfer bias consisting only of the DC voltage, scattering of toner can be suppressed by reducing the peak-to-peak value Vpp of the AC component to a value smaller than that when transferring the composite toner image including the transparent toner image onto a recording medium.

According to the present illustrative embodiment, the secondary transfer power source 82 is configured to output an AC component of the secondary transfer bias having a sinusoidal waveform and satisfying the condition of $\frac{1}{4}\times Vpp>|Voff|$. With this configuration, inadequate transfer of toner can be reduced and graded as Rank 3 and above.

Still referring to FIG. 8, a description is provided of the secondary transfer bias output from the secondary transfer power source 82 when transferring a composite toner image including a transparent toner image onto a recording medium in the secondary transfer nip. As shown in FIG. 8, in one cycle of the AC component of the secondary transfer bias, the time required for the toner to be charged to a negative polarity, thus causing the toner to move electrostatically from the belt side to the secondary transfer roller side, is longer than the time required for the toner to be charged to a positive polarity causing the toner to move electrostatically from the secondary transfer roller side to belt side. With this configuration, the toner is moved back and forth between the belt surface and the recording medium due to the alternating electric field in the secondary transfer nip, thereby enabling the toner to move from the belt side to the recording medium relatively.

According to the present illustrative embodiment, when transferring a composite toner image including a transparent toner image onto a recording medium in the secondary transfer nip, the secondary transfer power source 82 outputs the secondary transfer bias that satisfies the following relation: $f>2/(w/v)$, where f is a frequency (Hz) of the alternating current component, w is a width (mm) of the secondary transfer nip in the direction of movement of the intermediate transfer belt 21, and v is a process linear velocity (mm/sec). With this configuration, the number of back-and-forth movement of toner between the belt surface and the recording medium can be increased. More specifically, the toner is moved back and forth at least twice, thereby increasing reliably the amount of toner that moves to a place near the line images on the surface of the recording medium.

Whether the secondary transfer power source 82 outputs the secondary transfer bias including the superimposed bias or the secondary transfer bias including only the DC bias is determined based on an image having entered the secondary transfer nip, not per printing page. More specifically, when a portion of an entire composite toner image in the direction of movement of the belt having the transparent toner image is present in the secondary transfer nip, the secondary transfer power source 82 outputs the secondary transfer bias including the superimposed bias to reduce or prevent drop-outs around a line image and a character image. By contrast, when a portion of the composite toner image, other than where the transparent toner image is present, is in the secondary transfer nip, the secondary transfer power source 82 outputs the secondary transfer bias consisting only of the DC component.

Whether the portion of the composite toner image at which the transparent toner image is present is in the secondary transfer nip is determined based on an elapsed time from a predetermined reference time which is set for each printing page. More specifically, according to the present illustrative embodiment, when a predetermined time t1 elapses from a reference time Ts, a portion of the intermediate transfer belt 21 corresponding to a first group of pixels (hereinafter referred to as pixels in the first line) formed on the leading side of the recording medium in the main scanning direction enters the secondary transfer nip. The pixels in the first line exit the nip at timing defined by "Ts+t1+nip passing time".

In a case in which the pixels in the first line include a pixel that forms a dot in a transparent toner image, the secondary transfer bias including the superimposed bias is output from the time defined by "Ts+t1" to the time defined by "Ts+t1+nip passing time". Subsequently, whether or not the line of pixels having entered the secondary transfer nip at the time defined by "Ts+t1+nip passing time" includes a pixel that forms a dot in the transparent toner image is determined. In a case in which the line of pixels includes the pixel that forms the dot in the transparent toner image, the secondary transfer bias including the superimposed bias is output continuously until the nip passing time elapses.

By contrast, in a case in which the line of pixels does not include the pixel forming the dot in the transparent toner image at the time "Ts+t1+nip passing time", the secondary transfer power source 82 outputs the secondary transfer bias including only the DC bias until the pixel including the pixel forming the dot in the transparent toner image enter the secondary transfer nip.

In a case in which the first line of pixels does not include the pixel forming the dot in the transparent toner image, the secondary transfer power source 82 outputs the secondary transfer bias including only the DC bias until the pixels including the pixel forming the dot in the transparent toner image enter the secondary transfer nip. When the pixels including the pixel forming the dot in the transparent toner image enter the secondary transfer nip, the secondary transfer power source 82 outputs the secondary transfer bias including the superimposed bias until the nip passing time elapses. Subsequently, when the nip passing time elapses, whether or not the line of pixels having entered the secondary transfer nip includes the pixel that forms a dot in the transparent toner image is determined.

In a case in which the line of pixels includes the pixel that forms the dot in the transparent toner image, the secondary transfer bias including the superimposed bias is output continuously until the nip passing time elapses.

In a case in which the line of pixels does not include the pixel forming the dot in the transparent toner image at the time "Ts+t1+nip passing time", the secondary transfer power source 82 outputs the secondary transfer bias including only the DC bias until the pixels including the pixel forming the dot in the transparent toner image enter the secondary transfer nip. Thereafter, the same operation is repeated.

With this configuration, scattering of toner particles is suppressed, if not prevented entirely, when compared with deciding whether to use the transfer bias including the superimposed bias or the transfer bias including only the DC bias on every output page.

Alternatively, whether to use the transfer bias including the superimposed bias or the transfer bias including only the DC bias may be determined on every printing page. According to the illustrative embodiment, imaging conditions of the image forming unit 1T are configured such the amount of the transparent toner adhered to the recording medium per unit area is equal to or greater than 0.5 $mg/cm^2$.

When using the alternating current component having a sinusoidal waveform, the average potential Vave in one cycle of the superimposed bias coincides with the offset voltage Voff. In a case in which the alternating current component does not have a sinusoidal waveform and the average potential Vave has a value shifted to the transfer potential side beyond the offset voltage Voff which is the center value between the maximum value and the minimum value of the superimposed bias, the condition of $\frac{1}{4}\times Vpp>|Voff|$ does not have to be satisfied. FIGS. 13 through 19 show examples of such superimposed bias.

In the waveforms shown in FIGS. 13 through 19, the polarity of the average potential Vave is the toner transfer polarity (in the present examples, negative polarity) causing the toner to move electrostatically from the belt side to the secondary transfer roller side. Furthermore, the average potential Vave causes more easily the toner to move electrostatically from the belt side to the secondary transfer roller side when compared with the value of the offset voltage Voff.

A transfer time in the waveform having the conditions described above is longer than that in the waveform without such conditions. The transfer time herein refers to a time during which the average potential Vave has the toner transfer polarity in one cycle. The transfer time is obtained by subtracting a toner returning time from the cycle. The toner returning time (hereinafter referred to simply as returning time) is a time during which the average potential Vave has a polarity (in the present examples, positive polarity) opposite the toner transfer polarity.

During the transfer time, the above-described transfer peak value Vt is generated (refer to FIG. 8). The transfer peak value Vt is a value at which the potential difference from 0 V becomes the greatest. At this time, inadequate transfer of toner occurs easily due to electric discharge. With a smaller transfer peak value Vt, inadequate transfer of toner can be prevented more reliably. By increasing the above ratio greater than 50% so as to increase the transfer time, dropouts around the line images and the character images can be at acceptable levels with the smaller transfer peak value Vt. Accordingly, generation of a trace of electric discharge appearing in a form of white spots can be suppressed, if not prevented entirely.

According to the present illustrative embodiment, the intermediate transfer belt 21 has a tensile modulus of equal to or greater than 2 GPa so that desirable endurance can be achieved. According to experiments performed by the present inventors, with the use of such an intermediate transfer belt described above, occurrences of inadequate transfer of toner were reduced even more effectively. In other words, with the use of the intermediate transfer belt having the tensile modulus of equal to or greater than 2 GPa and the secondary transfer bias according to the illustrative embodiments, improper transfer of toner such as dropouts can be prevented more reliably.

The above-described image forming apparatus is an example of the image forming apparatus of the present invention. The present invention includes the following embodiments.

According to an aspect of this disclosure, an image forming apparatus includes a plurality of image bearing members (for example, the photosensitive drums 2T, 2Y, 2M, 2C, and 2K) to bear a toner image on a surface thereof; an intermediate transfer member (for example, the intermediate transfer belt 21) disposed facing the plurality of image bearing members, onto which toner images on the plurality of image bearing members are transferred such that they are superimposed one atop the other forming a composite toner image; a nip forming member (for example, the secondary transfer roller 26) to contact the intermediate transfer member to form a transfer nip; and a transfer bias output device (for example, the secondary transfer power source 82 and the controller 200) to output a transfer bias to generate a transfer electric field in the transfer nip so as to transfer the composite toner image formed on the intermediate transfer belt onto a recording medium. Upon transfer of the composite toner image including a particular toner image onto the recording medium in the transfer nip, the transfer bias output device outputs the transfer bias including a superimposed bias in which a direct current (DC) component is superimposed on an alternating current (AC) component. Upon transfer of the composite toner image without the particular toner image onto the recording medium in the transfer nip, the transfer bias power source outputs one of the transfer bias including the superimposed bias having a relatively small peak-to-peak value of the AC component and the transfer bias including only the DC component.

According to an aspect of this disclosure, the particular toner image is formed with a special color toner other than yellow, magenta, cyan, and black, and formed on one of the image bearing members. The special color toner includes, but is not limited to toner other than primary colors such as yellow, cyan, magenta, and black, a metal color toner, a transparent toner, a foam toner, a fluorescent toner, and a spot color. When transferring the composite toner image including the particular toner image onto a recording medium in the secondary transfer nip, the controller 200 enables the secondary transfer power source 82 to output the superimposed bias as the secondary transfer bias to suppress inadequate transfer of toner such as dropouts around line images and character images.

According to an aspect of this disclosure, when transferring the composite toner image including the particular toner image onto the recording medium in the transfer nip, the transfer bias output device outputs the transfer bias having an absolute value of a peak-to-peak value of the AC component equal to or greater than four times the absolute value of the DC component. With this configuration, as described above, when using the AC component having a sinusoidal waveform, the grade of inadequate transfer of toner can be at the acceptable level.

According to an aspect of this disclosure, upon transfer of the composite toner image including the particular toner image onto the recording medium in the transfer nip, the transfer bias output device outputs the transfer bias in which an average potential of the superimposed bias in every cycle of the AC component has a transfer polarity that causes the toner to move electrostatically from the intermediate transfer member side to the nip forming member side in the transfer nip, and the toner moves more easily from the intermediate transfer member side to the nip forming member side with the average potential than with a center value between a maximum value and a minimum value of the superimposed bias. With this configuration, the toner is moved back and forth between the belt surface and the recording medium due to the alternating electric field in the secondary transfer nip, thereby enabling the toner to move from the belt side to the recording medium relatively.

According to an aspect of this disclosure, upon transfer of the composite toner image including the particular toner image onto the recording medium in the transfer nip, the transfer bias power source outputs the transfer bias having a relation of $f>2/(w/v)$, where f is a frequency (Hz) of the AC component, w is a width of the transfer nip in the direction of movement of the intermediate transfer member, and v is a linear velocity (mm/sec) of the intermediate transfer member. With this configuration, the toner is moved back and forth between the intermediate transfer member and the recording medium at least twice, thereby increasing reliably the amount of toner that moves to the portion of the recording medium with line images.

According to an aspect of this disclosure, when transferring the composite toner image without the particular toner image onto the recording medium in the transfer nip, the transfer bias output device outputs the transfer bias having only the DC component. With this configuration, when transferring the composite toner image without the particular toner image onto the recording medium, the toner is not moved back and forth between the belt surface and the recording medium, hence preventing scattering of toner.

According to an aspect of this disclosure, in a case in which an area of the composite toner image at which the particular toner image is formed in the direction of movement of the intermediate transfer member is in the transfer nip, the transfer bias power source outputs the transfer bias including the superimposed bias in which the DC component is superimposed on the AC component, and in a case in which the area of the composite toner image at which the particular toner image is formed in the direction of movement of the intermediate transfer member is not present in the transfer nip, the transfer bias power source outputs the transfer bias including only the DC component. With this configuration, when transferring the composite toner image without the particular toner image onto the recording medium, the transfer bias including only the DC component is output so that the toner is not moved back and forth between the belt surface and the recording medium. Accordingly, scattering of toner is prevented. With this configuration, scattering of toner is suppressed, if not prevented entirely, when compared with deciding whether to use the transfer bias including the superimposed bias or the transfer bias including only the DC bias on every output page.

According to an aspect of this disclosure, the intermediate transfer member is a belt formed into an endless loop and has a tensile modulus of equal to or greater than 2 GPa. In other words, with the use of the intermediate transfer belt having the tensile modulus of equal to or greater than 2 GPa and the secondary transfer bias, improper transfer of toner such as dropouts can be prevented more reliably.

Improper transfer of toner such as dropouts around fine lines and character images on a solid color background are often formed with a particular color of toner including, but not limited to, a special color toner, a metal color toner, a transparent toner, a foam toner, and a fluorescent toner. When the composite toner image includes the particular toner image, inadequate transfer of toner around line images and character images may occur.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An image forming apparatus, comprising:

a plurality of image bearing members to bear a toner image on a surface thereof;

an intermediate transfer member disposed facing the plurality of image bearing members, onto which toner images on the plurality of image bearing members are transferred such that they are superimposed one atop the other forming a composite toner image; and a transfer device to transfer the composite toner image formed on the intermediate transfer member onto a recording medium, the transfer device including a nip forming member to contact the intermediate transfer member to form a transfer nip; and a transfer bias output device to output a transfer bias to form a transfer electric field in the transfer nip, wherein upon transfer of the composite toner image including a particular toner image onto the recording medium in the transfer nip, the transfer bias output device outputs the transfer bias including a first superimposed bias in which a direct current (DC) component is superimposed on an alternating current (AC) component, and wherein upon transfer of the composite toner image without the particular toner image onto the recording medium in the transfer nip, the transfer bias output device outputs one of the transfer bias including a second superimposed bias having a peak-to-peak value of the AC component smaller than that of the first superimposed bias and the transfer bias including only the DC component.

2. The image forming apparatus according to claim 1, wherein the particular toner image comprises a toner image formed with a special color toner other than yellow, magenta, cyan, and black.

3. The image forming apparatus according to claim 2, wherein the special color toner is a transparent toner.

4. The image forming apparatus according to claim 1, wherein upon transfer of the composite toner image including the particular toner image onto the recording medium in the transfer nip, the transfer bias output device outputs the transfer bias having an absolute value of a peak-to-peak value of the AC component equal to or greater than four times the absolute value of the DC component.

5. The image forming apparatus according to claim 1, wherein upon transfer of the composite toner image including the particular toner image onto the recording medium in the transfer nip, the transfer bias output device outputs the transfer bias in which an average potential of the superimposed bias in every cycle of the AC component has a transfer polarity that causes the toner to move electrostatically from the intermediate transfer member side to the nip forming member side in the transfer nip, and the toner moves more easily from the intermediate transfer member side to the nip forming member side with the average potential than with a center value between a maximum value and a minimum value of the first superimposed bias.

6. The image forming apparatus according to claim 1, wherein upon transfer of the composite toner image including the particular toner image onto the recording medium in the transfer nip, the transfer bias output device outputs the transfer bias having a relation of $$f>2/(w/v),$$

where f is a frequency (Hz) of the AC component, w is a width of the transfer nip in the direction of movement of the intermediate transfer member, and v is a linear velocity (mm/sec) of the intermediate transfer member.

7. The image forming apparatus according to claim 1, wherein upon transfer of the composite toner image without the particular toner image onto the recording medium in the transfer nip, the transfer bias output device outputs the transfer bias having only the DC component.

8. The image forming apparatus according to claim 1, wherein in a case in which an area of the composite toner image at which the particular toner image is formed in the direction of movement of the intermediate transfer member is in the transfer nip, the transfer bias output device outputs the transfer bias including the first superimposed bias in which the DC component is superimposed on the AC component, and wherein in a case in which the area of the composite toner image at which the particular toner image is formed in the direction of movement of the intermediate transfer member is not present in the transfer nip, the transfer bias output device outputs the transfer bias including only the DC component.

9. The image forming apparatus according to claim 1, wherein an amount of toner adhesion of the particular toner image on the recording medium per unit area is equal to or greater than 0.5 mg/cm$^2$.

10. The image forming apparatus according to claim 1, wherein the intermediate transfer member is a belt formed into an endless loop and has a tensile modulus of equal to or greater than 2 GPa.

11. An image forming apparatus, comprising:

a plurality of image bearing members;

an intermediate transfer member onto which toner images on the plurality of image bearing members are transferred to form a composite toner image; and a power source to output a transfer bias to transfer the composite toner image from the intermediate transfer member onto a sheet, wherein the power source outputs a first bias including an AC component when the composite toner image includes a particular color toner, and the power source outputs a second bias including only a DC component when the composite toner image does not include the particular color toner.

12. The image forming apparatus according to claim 11, wherein the particular color toner is a transparent toner.

13. The image forming apparatus according to claim 11, wherein the transfer bias output from the power source is determined on every printing page.

14. The image forming apparatus according to claim 11, wherein the first bias is a superimposed bias in which a DC component is superimposed on the AC component.

15. An image forming apparatus, comprising:

a plurality of image bearing members;

an intermediate transfer member onto which toner images on the plurality of image bearing members are transferred to form a composite toner image; and a power source to output a transfer bias to transfer the composite toner image from the intermediate transfer member onto a sheet, wherein the power source outputs a first bias including a first AC component when the composite toner image includes a particular color toner, and the power source outputs a second bias including a second AC component having a peak-to-peak value smaller than that of the first AC component when the composite toner image does not include the particular color toner.

16. The image forming apparatus according to claim 15, wherein the particular color toner is a transparent toner.

17. The image forming apparatus according to claim 15, wherein the transfer bias output from the power source is determined on every printing page.

18. The image forming apparatus according to claim 15, wherein the first bias is a first superimposed bias in which a first DC component is superimposed on the first AC component, and the second bias is a second superimposed bias in which a second DC component is superimposed on the second AC component.

19. An image forming apparatus, comprising:

a plurality of image bearing members *respectively bearing a yellow toner, a magenta toner, a cyan toner, a black toner and a metal color toner*;

an intermediate transfer member onto which toner images on the plurality of image bearing members are transferred to form a composite toner image; and a power source to output a transfer bias to transfer the composite toner image from the intermediate transfer member onto a sheet, wherein [the power source outputs a] *the transfer* bias [including] *includes a DC component in superimposition with* an AC component when the composite toner image includes [a transparent] *the metal color* toner, *and*

*wherein the transfer bias includes the DC component and does not include the AC component when the composite toner image does not include the metal color toner.*

20. The image forming apparatus according to claim 19, wherein an amount of toner adhesion of the [transparent] *metal color* toner on the sheet per unit area is equal to or greater than 0.5 mg/cm$^2$.

[21. The image forming apparatus according to claim 19, wherein the bias is a superimposed bias in which a DC component is superimposed on the AC component.]

22. The image forming apparatus according to claim [21] *19*, the *transfer bias is a* superimposed *that* bias has an absolute value of a peak-to-peak value of the AC component equal to or greater than four times the absolute value of the DC component.

23. The image forming apparatus according to claim 19, wherein the power source outputs the bias when the composite toner image includes one of a line image or a character image of the [transparent] *metal color* toner [that is formed on a solid background image of toner of a single color or a composite of at least two colors among yellow, magenta, cyan, and black].

*24. The image forming apparatus according to claim 11, wherein the particular color toner is a metal color toner.*

*25. The image forming apparatus according to claim 15, wherein the particular color toner is a metal color toner.*

*26. The image forming apparatus according to claim 19, wherein the metal color toner is polyester-based toner.*

*27. The image forming apparatus according to claim 23, wherein the metal color toner forms a solid background image of toner of a single color or a composite of at least two colors among yellow, magenta, cyan and black.*

*28. The image forming apparatus according to claim 19, wherein the plurality of image bearing members are arranged side by side.*

*29. The image forming apparatus according to claim 19, wherein a polarity of the transfer bias alternates between a positive polarity and a negative polarity in the superimposition of the AC component and the DC component.*

*30. The image forming apparatus according to claim 19, wherein upon transfer of the toner image onto the sheet, the power source outputs the transfer bias in which an average potential of the superimposed bias in every cycle of the AC component has a transfer polarity that causes toner to move electrostatically from an intermediate transfer member side to a nip forming member side in a transfer nip.*

*31. The image forming apparatus according to claim 30, wherein the toner moves from the intermediate transfer member side to the nip forming member side with the average potential than with a center value between a maximum value and a minimum value of the superimposed bias.*

*32. An image forming apparatus, comprising:*

*an image bearing member; and*

*a power source to output a transfer bias to transfer a toner image onto a sheet,*

*wherein the power source outputs a bias including an AC component when the toner image includes a metal color toner,*

*wherein the bias is a superimposed bias in which a DC component is superimposed on the AC component, and*

*wherein upon transfer of the toner image onto the sheet, the power source outputs the transfer bias in which an average potential of the superimposed bias in every cycle of the AC component has a transfer polarity that causes toner to move electrostatically from an intermediate transfer member side to a nip forming member side in a transfer nip, and the toner moves from the intermediate transfer member side to the nip forming member side with the average potential than with a center value between a maximum value and a minimum value of the superimposed bias.*

* * * * *